(12) United States Patent
Shea et al.

(10) Patent No.: US 8,861,144 B2
(45) Date of Patent: Oct. 14, 2014

(54) TRIGGERED ARC FLASH ARRESTER AND SWITCHGEAR SYSTEM INCLUDING THE SAME

(75) Inventors: John J. Shea, Pittsburgh, PA (US); Robert Kirkland Smith, Ithaca, NY (US); Benjamin A. Rosenkrans, Painted Post, NY (US); Louis G. Campbell, Elmira, NY (US)

(73) Assignee: Eaton Corporation, Cleveland, OH (US)

( * ) Notice: Subject to any disclaimer, the term of this patent is extended or adjusted under 35 U.S.C. 154(b) by 350 days.

(21) Appl. No.: 13/296,765

(22) Filed: Nov. 15, 2011

(65) Prior Publication Data

US 2013/0120879 A1    May 16, 2013

(51) Int. Cl.
| | | |
|---|---|---|
| H01H 33/66 | (2006.01) | |
| H01H 33/662 | (2006.01) | |
| H01H 33/664 | (2006.01) | |
| H01T 2/02 | (2006.01) | |
| H02H 3/00 | (2006.01) | |

(52) U.S. Cl.
CPC ............... *H01T 2/02* (2013.01); *H01H 33/664* (2013.01); *H01H 33/6643* (2013.01); *H01H 33/66* (2013.01); *H02H 3/00* (2013.01)
USPC .............................. 361/13; 361/117; 361/120

(58) Field of Classification Search
CPC . H01H 33/66; H01H 33/6643; H01H 33/664; H01T 2/02
USPC ............................................ 361/13, 120, 117
See application file for complete search history.

(56) References Cited

U.S. PATENT DOCUMENTS

| | | | | |
|---|---|---|---|---|
| 3,210,505 A | * | 10/1965 | Porter | 218/118 |
| 3,816,798 A | * | 6/1974 | Lafferty | 315/330 |
| 4,196,327 A | * | 4/1980 | Kurosawa et al. | 218/129 |
| 4,345,293 A | * | 8/1982 | Hasse et al. | 361/117 |

(Continued)

FOREIGN PATENT DOCUMENTS

| | | |
|---|---|---|
| CN | 2276196 Y | 3/1998 |
| CN | 2852361 Y | 12/2006 |

(Continued)

OTHER PUBLICATIONS

European Patent Office, "International Search Report and Written Opinion", Oct. 23, 2012, 10 pp.

(Continued)

*Primary Examiner* — Zeev V Kitov
(74) *Attorney, Agent, or Firm* — Eckert Seamans Cherin & Mellott, LLC; Kirk D. Houser

(57) ABSTRACT

A triggered arc flash arrester includes an envelope structured to operate at: a pressure less than about 1.33 Pa; or a pressure greater than 0.10857 MPa; a plurality of conductors partially disposed within the envelope; a number of gaps disposed between the plurality of conductors within the envelope; and a shorting structure selected from the group consisting of a triggered gap and a fuse. The shorting structure is operatively associated with the number of gaps. The shorting structure is structured to electrically short the plurality of conductors either together or to ground, in order to create an arc within the envelope which is electrically in parallel to an arc fault causing the arc fault internal to switchgear to be extinguished.

28 Claims, 12 Drawing Sheets

(56) References Cited

U.S. PATENT DOCUMENTS

| | | | |
|---|---|---|---|
| 6,437,273 | B2 | 8/2002 | Stechbarth et al. |
| 6,633,009 | B1 | 10/2003 | Shea |
| 6,657,150 | B1 | 12/2003 | Shea et al. |
| 6,693,438 | B2 | 2/2004 | Shea |
| 6,724,604 | B2 | 4/2004 | Shea |
| 6,813,127 | B2 | 11/2004 | Edrozo et al. |
| 6,839,209 | B2 | 1/2005 | Shea et al. |
| 6,853,525 | B2 | 2/2005 | Hetzmannseder et al. |
| 7,035,068 | B2 | 4/2006 | Shea |
| 7,095,236 | B2 | 8/2006 | Slamecka |
| 7,145,757 | B2 | 12/2006 | Shea et al. |
| 7,714,240 | B1 | 5/2010 | Roesler et al. |
| 7,821,749 | B2 * | 10/2010 | Asokan et al. ............ 361/1 |
| 8,212,417 | B2 * | 7/2012 | Urban et al. ............ 307/106 |
| 2003/0214302 | A1 | 11/2003 | Slamecka |
| 2008/0142485 | A1 | 6/2008 | Gentsch et al. |
| 2009/0120773 | A1 | 5/2009 | Gentsch et al. |
| 2010/0155371 | A1 | 6/2010 | Gentsch |
| 2010/0219162 | A1 | 9/2010 | Gentsch |
| 2011/0057762 | A1 | 3/2011 | Burger et al. |
| 2011/0315662 | A1 * | 12/2011 | Byron et al. ............ 218/140 |
| 2013/0140290 | A1 * | 6/2013 | Kawasaki et al. ........... 219/136 |

FOREIGN PATENT DOCUMENTS

| | | |
|---|---|---|
| EP | 0 546 678 A1 | 6/1993 |
| EP | 0 563 904 A1 | 10/1993 |
| EP | 2 200 066 A1 | 6/2010 |
| EP | 1 115 187 A2 | 7/2011 |
| FR | 2 149 661 A5 | 3/1973 |
| RU | 2207647 C1 | 6/2003 |
| WO | 98/29928 A2 | 7/1998 |
| WO | 03/107369 A1 | 12/2003 |
| WO | 03/107371 A1 | 12/2003 |
| WO | 2009/012788 A1 | 1/2009 |
| WO | 2009/030443 A1 | 3/2009 |
| WO | 2010/022938 A1 | 3/2010 |
| WO | 2010/078918 A1 | 7/2010 |

OTHER PUBLICATIONS

Wikipedia Foundation, "Marx generator", http://en.wikipedia.org/wiki/Marx_generator, Aug. 30, 2011, 5 pp.

Zhou, Z., et al., "Delay Calculation of Field-Breakdown Triggered Vacuum Switch", IEEE XXIVth Int. Symp. on Discharges and Electrical Insulation in Vacuum—Braunschweig, 2010, pp. 56-59.

Ahmetgareev, M.R., et al., "High Current Triggered Vacuum Switch for Electric Power Industry", IEEE XXIVth Int. Symp. on Discharges and Electrical Insulation in Vacuum—Braunschweig, 2010, pp. 138-141.

Xing-Ming, F., et al., "A Fast Making Vacuum Circuit Breaker Research and its Applications", IEEE XXIVth Int. Symp. on Discharges and Electrical Insulation in Vacuum—Braunschweig, 2010, pp. 146-149.

Schümann, U., "Breakdown Voltage of Electrode Arrangements in Vacuum Circuit Breakers", IEEE Transactions on Dielectrics and Electrical Insulation, vol. 10, No. 4., Aug. 2003, pp. 557-562.

Peterkin, F.E., et al., "Physical mechanism of triggering in trigatron spark gaps", Department of Electrical Engineering, P. F. (Paul Frazer) Williams Publications, University of Nebraska—Lincoln, 1988, pp. 181-184.

Voshall, R.E., et al., "Delay Times and Jitter in Triggered Vacuum Spark Gaps Using Metal Vapor and Surface Flashover Types of Triggers", Proceedings of the 5th IEEE Pulse Power Conference, Washington, D.C., Jun. 10, 1985, pp. 272-275.

Xing-Ming, F., et al., "Experimental Research on the Triggering Characteristic of TVS Under AC Condition", IEEE XXIVth Int. Symp. on Discharges and Electrical Insulation in Vacuum—Braunschweig, 2010, pp. 23-26.

Jiyan, Z., et al., "Theoretical Analyses of Arcs in Triggered Vacuum Switches", IEEE 19th Int. Symp. on Discharges and Electrical Insulation in Vacuum—Xi'an, 2000, pp. 192-194.

Park, S.S., et al., "Development of a Triggered Vacuum Switch for a ETC Gun System", IEEE, 2003, pp. 1367-1370.

Gentsch, D., et al., "New Ultra Fast Earthing Switch (UFES) device based on the vacuum switching principle", IEEE XXIVth Int. Symp. on Discharges and Electrical Insulation in Vacuum—Braunschweig, 2010, pp. 121-124.

Jiyan, Z., et al., "Theory and Application of Triggered Vacuum Switches", IEEE 19th Int. Symp. on Discharges and Electrical Insulation in Vacuum—Xi'an, 2000, pp. 363-366.

Shixin, X., et al., "The Experimental Study of Long-gap Vacuum Arc", IEEE XXIVth Int. Symp. on Discharges and Electrical Insulation in Vacuum—Braunschweig, 2010, 4 pp.

Schade, E., "Physics of High-Current Interruption of Vacuum Circuit Breakers", IEEE Transactions on Plasma Science, vol. 33, No. 5, Oct. 2005, pp. 1564-1575.

Selzer, A., "Vacuum Interruption—A Review of the Vacuum Arc and Contact Functions", IEEE Transactions on Industry Applications, vol. IA-8, No. 6, Nov./Dec. 1972, pp. 707-722.

Slade, P.G., "The Vacuum Interrupter, Theory, Design and Application", CRC Press, 2008, pp. i, ii; 198-236.

Slade, P.G., et al., "Effects of Arc Shield Proximity to the Electric Contacts on the Current Interruption Capability of Vacuum Interrupters", E & I, vol. 107, Springer-Verlag, Wien Austria, 1990, pp. 138-140.

* cited by examiner

TRIGGERED ARC FLASH ARRESTER AND SWITCHGEAR SYSTEM INCLUDING THE SAME

BACKGROUND

1. Field

The disclosed concept pertains generally to arc flash arresters and, more particularly, to arc flash arresters, such as, for example, shorting switches or other devices that arrest or quench an arc flash or arcing fault. The disclosed concept also pertains to switchgear systems including an arc flash arrester.

2. Background Information

Switchgear typically includes a combination of an electrical busway and electrical disconnects, fuses and/or circuit breakers employed to electrically connect and disconnect electrical equipment. As one non-limiting example, switchgear includes an assembly of one or more motor starters that can also contain circuit breakers and fused switches. Example switchgear devices include, but are not limited by, a circuit interrupter, such as a circuit breaker (e.g., without limitation, low voltage; medium voltage; high voltage); a motor controller/starter; and/or any suitable device which carries or transfers current from one place to another.

Electric power systems incorporate switches for control and protection purposes. Distribution systems, which form part of an overall electric power system, include main and branch power buses and circuit breakers mounted in metal cabinets to form switchgear. Interruption of current flow in the buses of the distribution system by a circuit breaker creates an arc as the contacts of the circuit breaker open. These arcs caused by interruption are contained and extinguished in the normal course of operation of the circuit breaker.

At times, however, unintended arcing faults can occur within switchgear cabinets, such as between power buses, or between a power bus and a grounded metal component. Such arcing faults can produce high energy gases, which pose a threat to the structure and nearby personnel. This is especially true when maintenance is performed on or about live power circuits. Frequently, a worker inadvertently shorts out the power bus, thereby creating an arcing fault inside the enclosure. The resulting arc blast creates an extreme hazard and could cause injury or even death. This problem is exacerbated by the fact that the enclosure doors are typically open for maintenance.

A common approach to protecting personnel from arcing faults in switchgear has been to design the metal enclosures to withstand the blast from the arcing fault. This has been done at great additional costs due to the heavy gauge metal used and numerous weld joints needed to prevent flying debris. Even with these precautions, the blast from an arcing fault inside the switchgear cannot be contained.

Recently, methods have been developed to minimize the severity of the blast from an internal arcing fault. These methods include pressure sensing and light detection, which sense the arcing fault within the switchgear and cause a circuit breaker to trip before significant damage can result. The pressure sensing method is limited by the insensitivity of the pressure sensors. By the time cabinet pressure has risen to detectable levels, the arcing fault has already caused significant damage. In a medium voltage system, an internal arcing fault would occur somewhere inside of the switchgear enclosure, frequently, but certainly not limited to the point where the cables servicing the load are connected.

In a low voltage system, such as, for example, a motor control center, an internal arcing fault could occur within the load center panelboard when, for example, servicing live panelboards. A bare live copper bus could inadvertently be shorted.

Another example for both low and medium voltage systems would be the shorting of the conductors by rodents, snakes, or other animals or objects.

In the low voltage system, the arcing fault could clear itself, by burning or ejecting the short, but it may take more than one-half cycle to do so, thereby causing significant damage and great risk of injury to workers even in one-half cycle of arcing.

A medium voltage system would behave similar to the low voltage system; however, the medium voltage system would be less likely to be self-extinguishing. The crowbarring of a shorting switch will extinguish the arc. Once the arc is out, and if the short has been burned away or removed, then, after repairs are made, system power can be restored.

It is known to employ a high-speed shorting switch to eliminate an arcing fault. Known arc elimination devices and systems produce a bolted fault across the power bus (e.g., phase-to-phase, such as two switches for three phases; phase-to-ground, such as three switches for three phases), in order to eliminate the arcing fault and prevent equipment damage and personnel injury due to arc blasts. It is also known to employ various types of crowbar switches for this purpose. The resulting short on the power bus causes an upstream circuit breaker to clear the bolted fault by removing power. See, for example, U.S. Pat. Nos. 7,145,757; 7,035,068; 6,839,209; 6,724,604; 6,693,438; 6,657,150; and 6,633,009. As a result, system power is lost due to the tripping of the upstream circuit breaker.

Known prior medium voltage shorting switches employ vacuum interrupters or vacuum envelopes having a partial vacuum therein.

Known prior low voltage shorting switches employ air at atmospheric pressure as an insulating medium.

It is known to employ sealed-off triggered vacuum switches (TVSs) to discharge a capacitor bank through the series combination of an inductor and a load resistor. It is also known to employ TVSs in the field of pulse power technology, such as a source controller in heavy laser and high power microwave, and in an electro-magnetic launcher (EML). Triggered spark gaps are known to be used in pulse power switching applications, such as in a Marx Bank.

There is room for improvement in arc flash arresters.

There is also room for improvement in switchgear systems including an arc flash arrester.

SUMMARY

These needs and others are met by embodiments of the disclosed concept, which eliminate an internal arc flash from switchgear by diverting an uncontrolled arc flash into an envelope having a number of gaps disposed between conductors within the envelope.

In accordance with one aspect of the disclosed concept, a triggered arc flash arrester comprises: an envelope structured to operate at: (a) a pressure less than about 1.33 Pa; or (b) a pressure greater than 0.10857 MPa; a plurality of conductors partially disposed within the envelope; a number of gaps disposed between the plurality of conductors within the envelope; and a shorting structure selected from the group consisting of a triggered gap and a fuse, wherein the shorting structure is operatively associated with the number of gaps, and wherein the shorting structure is structured to electrically short the plurality of conductors either together or to ground, in order to create an arc within the envelope which is electrically in parallel to an arc fault causing the arc fault internal to switchgear to be extinguished.

The shorting structure may be the triggered gap; and the triggered gap may be formed by one of the plurality of conductors and an electrode disposed within and insulated from the one of the plurality of conductors.

The electrode may be an elongated electrode having a first end and an opposite second end; the one of the plurality of conductors may have a first opening proximate the first end of the elongated electrode and proximate another one of the plurality of conductors, and a second opening, larger than the first opening, proximate an insulator disposed between the elongated electrode and the one of the plurality of conductors; and the insulator may have a third opening, larger than and proximate the second opening, in order to prevent metal deposition on a surface of the insulator within the envelope between the elongated electrode and the one of the plurality of conductors.

The envelope may comprise a ring electrode; the shorting structure may be the triggered gap; and the triggered gap may be formed by a gap between the ring electrode and a cylindrical portion of one of the plurality of conductors.

The envelope may comprise a shield and a trigger rod electrode having a first end electrically connected to the shield and an opposite second end; the shorting structure may be the triggered gap; and the triggered gap may be formed by a gap between the opposite second end of the trigger rod electrode and a portion of one of the plurality of conductors.

The envelope may comprise a shield; the shorting structure may be the fuse; and the fuse may be electrically connected between the shield and one of the plurality of conductors.

The shorting structure may be the fuse; the envelope may comprise a ring electrode having a first portion disposed external to the envelope and a second portion disposed internal to the envelope; and the fuse may be electrically connected between the ring electrode and one of the plurality of conductors.

The envelope may further comprise an insulative cylinder disposed therein between the shield and the one of the plurality of conductors; the one of the plurality of conductors may have a cylindrical shape with a planar surface; the insulative cylinder may have an annular end parallel to the planar surface; and the annular end may support the fuse.

The annular end may have an outer edge proximate the shield and an inner edge proximate the one of the plurality of conductors; and the fuse may be disposed in a linear segment directly between the outer edge and the inner edge.

The annular end may have an outer edge proximate the shield and an inner edge proximate the one of the plurality of conductors; and the fuse may be disposed in a generally circular segment beginning at the outer edge, disposed over and around the annular end, and ending at the inner edge.

The shorting structure may be the triggered gap; and the triggered gap may be structured to be actuated by a number of voltage pulses having a voltage magnitude structured to breakdown the triggered gap.

The envelope may comprise a shield partially disposed within the envelope; the shield may not be electrically connected to any potential; and the triggered gap may be partially disposed within the shield.

The envelope may comprise a shield partially disposed within the envelope; the shorting structure may be the triggered gap; the triggered gap may be partially disposed within the shield; and the triggered gap may include a plasma exhaust disposed within the shield proximate the number of gaps and a trigger electrical connection disposed external to the envelope.

The envelope may comprise a ceramic tube having a ceramic surface therein and a shield partially disposed within the envelope; the shorting structure may be the triggered gap; the triggered gap may be partially disposed within the shield; and one of the plurality of conductors may have a shape structured to prevent metal deposition on the ceramic surface within the envelope.

As another aspect of the disclosed concept, a system comprises: switchgear including a power circuit; a triggered arc flash arrester comprising: an envelope structured to operate at: (a) a pressure less than about 1.33 Pa; or (b) a pressure greater than 0.10857 MPa, a plurality of conductors partially disposed within the envelope, a number of gaps disposed between the plurality of conductors within the envelope, and a shorting structure selected from the group consisting of a triggered gap and a fuse, wherein the shorting structure is operatively associated with the number of gaps, and wherein the shorting structure is structured to electrically short the plurality of conductors either together or to ground, in order to create an arc within the envelope which is electrically in parallel to an arc fault causing the arc fault internal to the switchgear to be extinguished; a current sensor sensing current flowing through the power circuit including a plurality of power conductors corresponding to the plurality of conductors; a light sensor sensing light operatively associated with the arcing fault for the power circuit; and a trigger circuit structured to trigger the shorting structure when the sensed current is greater than a first predetermined threshold and when the sensed light is greater than a second predetermined threshold.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
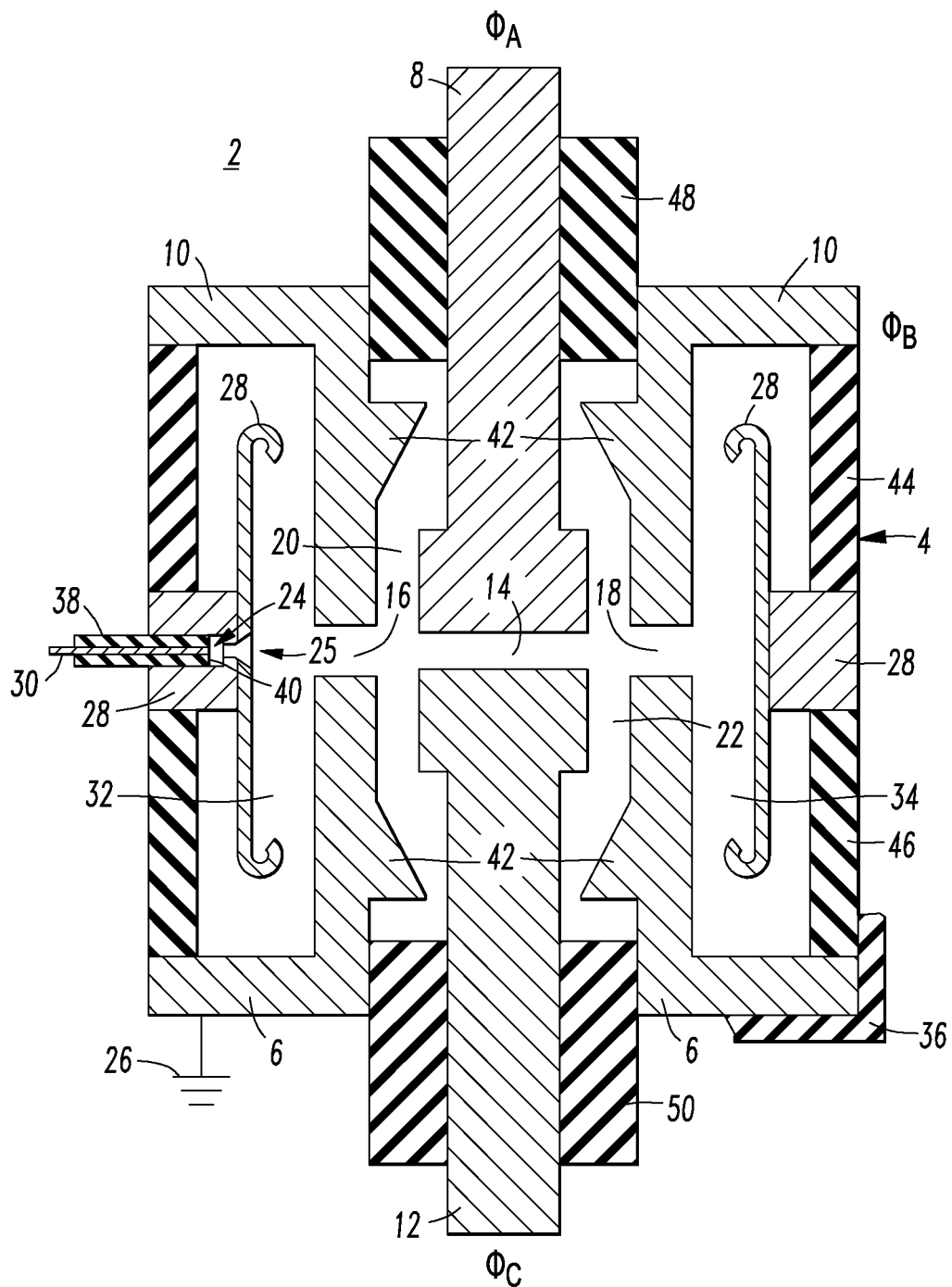
FIG. 1 is a cross sectional view of a single envelope, three phase grounding, shield triggered arc flash arrester in accordance with an embodiment of the disclosed concept.

As employed herein, the term "number" shall mean one or an integer greater than one (i.e., a plurality).

As employed herein, the term "electrical conductor" or "conductor" shall mean a wire (e.g., solid; stranded; insulated; non-insulated), a copper conductor, an aluminum conductor, a suitable metal conductor, or other suitable material or object that permits an electric current to flow easily.

As employed herein, the term "vacuum envelope" means an envelope employing a partial vacuum therein.

As employed herein, the term "partial vacuum" means a space (e.g., within a vacuum envelope) partially exhausted (e.g., to the highest degree practicable; to a relatively high degree; to a degree suitable for use in an arc flash arrester application; about $10^{-7}$ Torr) by a suitable mechanism (e.g., without limitation, an air pump; a vacuum furnace).

As employed herein, the term "atmospheric pressure" means force per unit area exerted against a surface by gas pressure. For example and without limitation, average sea-level pressure is 101.325 kPa (1013.25 mbar, or hPa) or 29.921 inches of mercury (in Hg) or 760 millimeters (mmHg, or Torr) or about 14.696 psi. Atmospheric pressure varies with different weather conditions and different altitudes above or below sea-level on the Earth. For example, the highest known barometric pressure ever recorded on Earth was 1,085.7 hectopascals (hPa) (or 0.10857 MPa) (or 32.06 in Hg) measured in Tonsontsengel, Mongolia on Dec. 19, 2001.

As employed herein, the term "low voltage" means a voltage up to about 1 $kV_{RMS}$.

As employed herein, the term "medium voltage" means a voltage in the range from greater than a low voltage to about 38 $kV_{RMS}$.

As employed herein, the term "high voltage" means a voltage greater than a medium voltage.

As employed herein, the term "arc flash arrester" means a shorting switch or other switching device structured to arrest or quench an arc flash or arcing fault by causing ionization and a subsequent breakdown of a main gap between open contacts (e.g., fixed and movable contacts; two or more fixed contacts).

As employed herein, the term "air" means the atmosphere of the planet Earth. Dry air contains, for example and without limitation, about (by volume) 78.09% nitrogen, about 20.95% oxygen, about 0.93% argon, about 0.039% carbon dioxide, and small amounts of other gases.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

Directional phrases used herein, such as, for example, top, bottom, front, back, left, right, upper, lower and derivatives thereof, relate to the orientation of the elements shown in the drawings and are not limiting upon the claims unless expressly recited therein.

The disclosed concept is described in association with one-phase and three-phase triggered arc flash arresters for low voltage or medium voltage operation, although the disclosed concept is applicable to a wide range of power circuit voltages and power circuits having any number of phases.

The disclosed concept employs either a triggered gap, such as a triggered spark gap, or a triggered fuse to cause electrical shorting of a plurality of conductors, either together or to ground, in order to create an arc within the envelope which is electrically in parallel to an arc fault causing the arc fault internal to switchgear to be extinguished. These provide, for example and without limitation, soft grounding, which can be an arc to ground or some arc impedance in the circuit as opposed to a solid metal-to-metal electrical connection.

Figure 8:
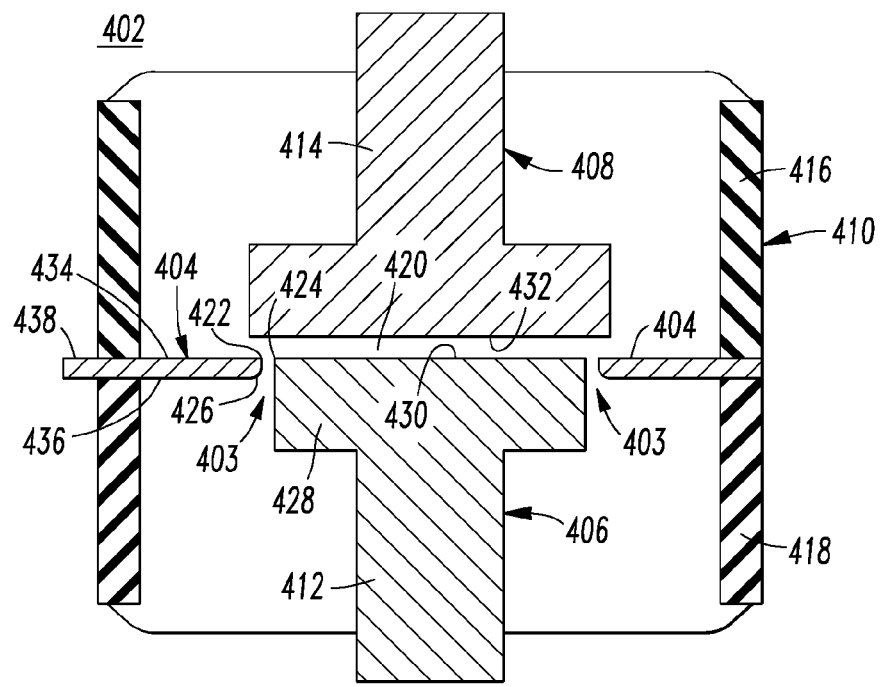
FIG. 8 is a cross sectional view of a single phase, triggered arc flash arrester including a ring electrode in accordance with another embodiment of the disclosed concept.
Figure 9:
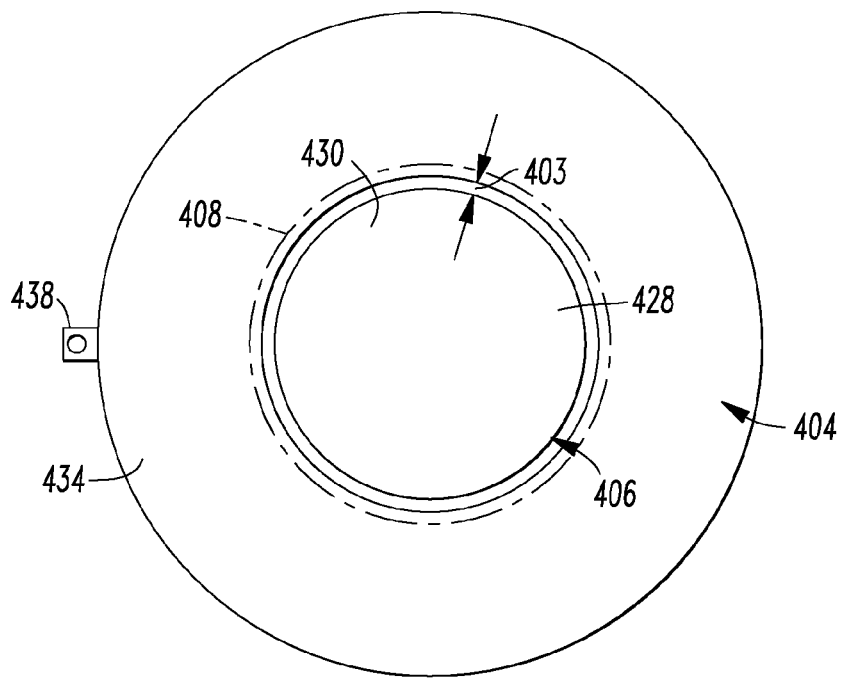
FIG. 9 is a plan view of the ring electrode and lower conductor of FIG. 8.
Figure 20:
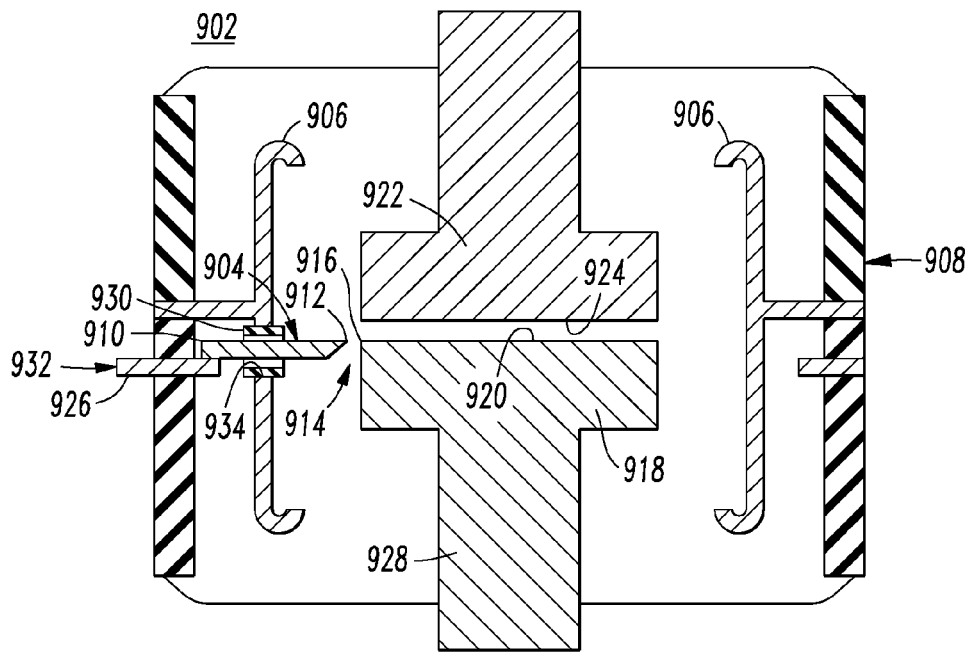
FIG. 20 is a cross sectional view of a single phase, floating shield, triggered arc flash arrester including a trigger rod electrode in accordance with another embodiment of the disclosed concept.
Figure 21:
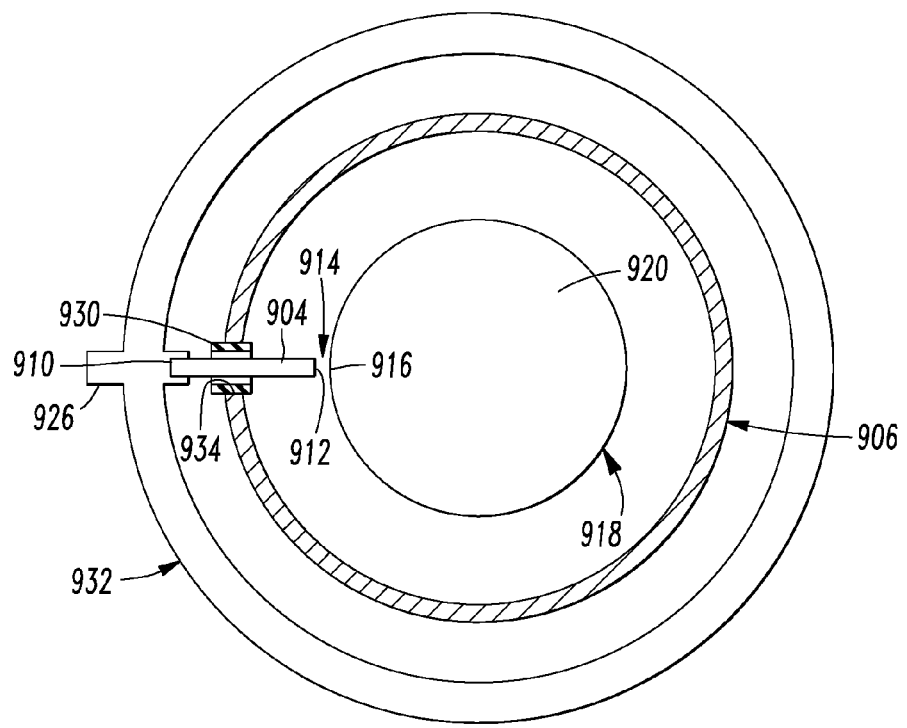
FIG. 21 is a plan view of the floating shield, trigger rod electrode and lower conductor of FIG. 20.

Non-limiting examples of a triggered spark gap include: (1) trigger electrode rods (FIGS. 1-7); (2) ring electrode triggers (FIGS. 8 and 9); (3) a shield with a single electrode trigger rod (FIGS. 10 and 11); and (4) a floating shield with a single electrode trigger rod (FIGS. 20 and 21).

Non-limiting examples of a triggered fuse include: (1) fuse ribbons (FIGS. 12-15, 22 and 23); and (2) fuse wires (FIGS. 12, 14-18, 22 and 23).

Referring to FIG. 1, a triggered arc flash arrester 2 includes an envelope 4 structured to operate at: (a) a pressure (e.g., without limitation, about $10^{-7}$ Torr; a partial vacuum) less than about 1.33 Pa (about $10^{-2}$ Torr); or (b) a pressure greater than 0.10857 MPa (about 815 Torr). A plurality of conductors 6,8,10,12 are partially disposed within the envelope 4. A number of gaps, such as 14,16,18,20,22, are disposed between the conductors 6,8,10,12 within the envelope 4. A shorting structure, such as a triggered gap 24, is operatively associated with (e.g., disposed in suitable proximity to) the number of gaps. The shorting structure, as will be described, is structured to electrically short the plurality of conductors 6,8,10,12 either together or to ground 26 (e.g., as shown with conductor 6), in order to create an arc within the envelope 4 which is electrically in parallel to an arc fault causing the arc fault internal to switchgear (not shown) to be extinguished.

The example triggered arc flash arrester 2 employs the single envelope 4 for three phases (e.g., phases A, B and C) on the three conductors 8,10,12 and the ground 26 on the conductor 6, although any of the conductors 6,8,10,12 can be grounded. The envelope 4 can support a suitable partial vacuum, a pressure less than about 1.33 Pa, or a pressure greater than 0.10857 MPa (e.g., without limitation, 5 atmospheres). The conductors 6,8,10,12 can be fixed or stationary, or one of the conductors 8 or 12 can be movable (e.g., as in a vacuum switch or vacuum interrupter). For example, all of the conductors 6,8,10,12 being fixed provides for no moving parts, high speed operation and reliability. In the example embodiment, the triggered gap 24 is partially disposed within a shield 28, with a trigger electrode 30 exiting the envelope 4. The purpose of the shield 28 is to prevent metal deposition on the inside wall of the envelope 4 (e.g., without limitation, a ceramic bottle). If, for example, metal was deposited on the inside wall, then the envelope 4 might short out.

The example triggered arc flash arrester 2 can be employed, for example and without limitation, for medium voltage application. A short to ground 26 is created when the triggered gap 24 or triggered spark gap is triggered electronically. The spark causes metal ionization which, in turn, causes the number of gaps, such as 14,16,18,20,22, to breakdown thereby grounding the three phases on conductors 8,10,12. For example, the spark ionizes metal since it is, for example, in a partial vacuum. At pressures greater than one atmosphere, if sufficient energy is deposited in the spark gap or fuse, then the main switch contacts will breakdown. The metal vapor ions between the main gaps 14,16,18,20,22 cause them to breakdown.

The example conductors 6,8,10,12 and the shield 28 in the cross sectional view of FIG. 1 are in cylindrical rotation in the triggered arc flash arrester 2.

As will be discussed, the triggered gap 24 is structured to be actuated by a number of voltage pulses of suitable duration and having a voltage magnitude structured to breakdown the triggered gap 24. In this example, there are four conductors 6,8,10,12, and the three example phases (e.g., phases A, B and C) can be connected along with the ground 26 to any combination of these conductors.

The example envelope 4 includes the example shield 28 partially disposed within the envelope 4. In this example, the shield 28 is not electrically connected to any potential (e.g., ground; one of the three example phase voltages). The example triggered gap 24 is partially disposed within the shield 28, with the trigger electrode 30 exiting the envelope 4 and the shield 28. The example shield 28 is partially disposed within the envelope 4. The example triggered gap 24 includes an example plasma exhaust 25 disposed within the shield 28 proximate the number of gaps 14,16,18,20,22 and a trigger electrical connection formed by the trigger electrode 30 and the ground 26 disposed external to the envelope 4.

In this example, the number of gaps 14,16,18,20,22 are disposed between the conductors 6,8,10,12, and other gaps 32,34 are disposed between the shield 28 and the conductors 6,10. Although not required, as will be discussed below, these gaps 14,16,18,20,22,32,34 meet BIL spacing requirements.

The example triggered arc flash arrester 2 can be encapsulated in a suitable insulator, such as the example polyurethane molding 36 (partially shown for convenience of illustration), for increased BIL.

The example envelope 4 also includes a ceramic tube 38 having a ceramic surface 40 therein. The ceramic tube 38 insulates the shield 28 from the trigger electrode 30. The shield 28 preferably has a shape proximate the triggered gap 24 and the plasma exhaust 25 structured to prevent metal deposition on the ceramic surface 40 within the envelope 4.

The conductors 6,8,10,12 can be any suitable conductor (e.g., without limitation, copper-chrome; tungsten; copper; steel; an electrode of differing material on a copper conductor). The conductors 6,10 may optionally include a shield 42 thereon. The envelope 4 is formed by a number of cylindrical insulators (e.g., ceramic) 44,46, which are brazed to the respective conductors 10,6 at each end. The conductors 8,12 are insulated from the conductors 10,6 by cylindrical insulators (e.g., ceramic) 48,50, which are brazed to the conductors 10,6, respectively, at the top and bottom (with respect to FIG. 1) of the triggered arc flash arrester 2. The shield 42 of the conductors 6,10 has a step shape that creates a "shadow" over the respective insulators 50,48, in order to prevent undesired metal deposition over the ceramic surface thereof. The cylindrical insulator (e.g., ceramic) 38, which insulates the shield 28 from the trigger electrode 30, is brazed to the shield 28.

Figure 2:
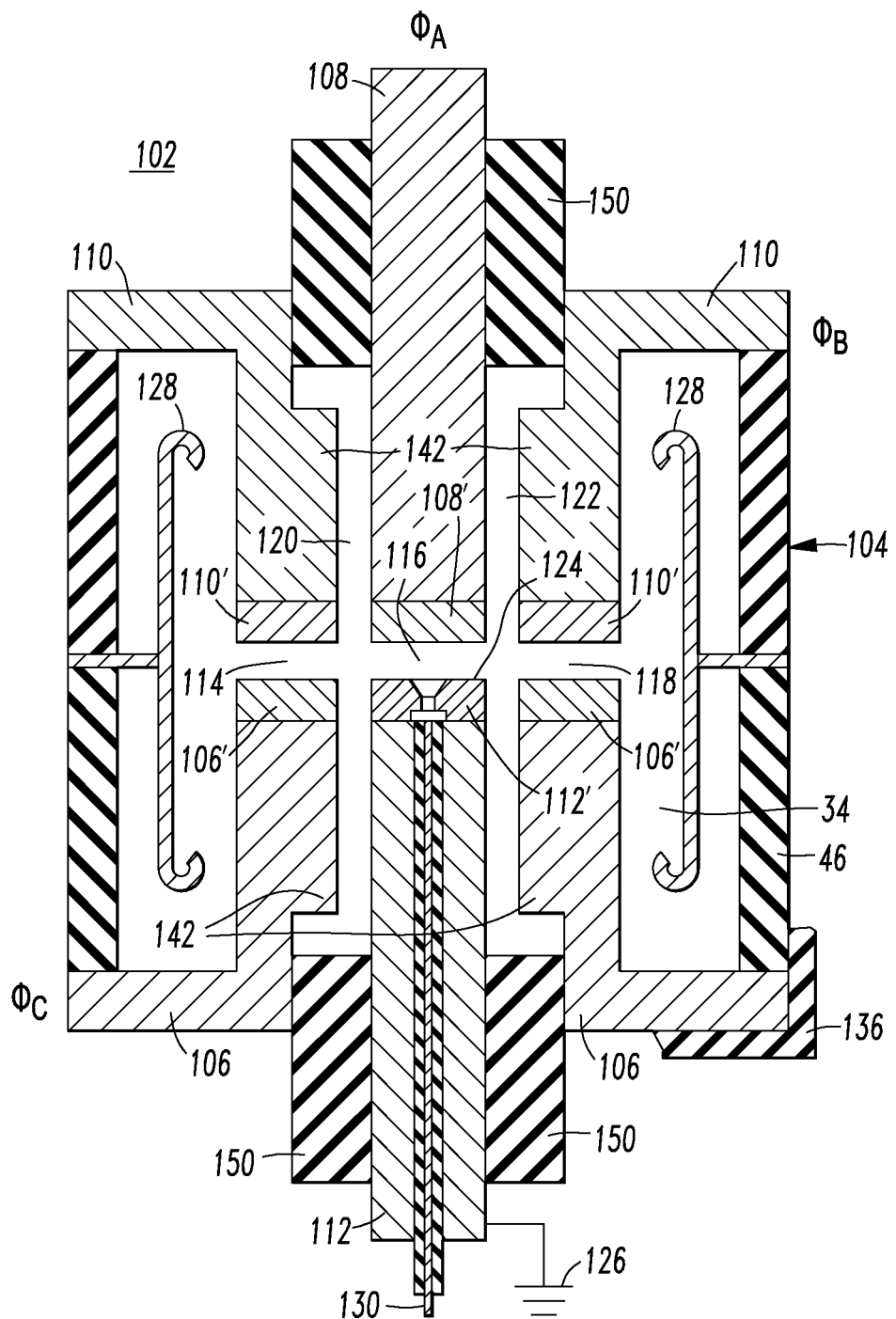
FIG. 2 is a cross sectional view of a single envelope, three phase grounding, electrode triggered arc flash arrester in accordance with another embodiment of the disclosed concept.

FIG. 2 shows another triggered arc flash arrester 102 including an envelope 104 structured to operate at: (a) a pressure (e.g., without limitation, about $10^{-7}$ Torr; a partial vacuum) less than about 1.33 Pa (about $10^{-2}$ Torr); or (b) a pressure greater than 0.10857 MPa (about 815 Torr). A plurality of conductors 106,108,110,112 are partially disposed within the envelope 104. A number of gaps, such as 114,116, 118,120,122, are disposed between the conductors 106,108, 110,112 within the envelope 104. A shorting structure, such as a triggered gap 124, is operatively associated with (e.g., disposed in suitable proximity to) the number of gaps. The shorting structure, as will be described, is structured to electrically short the plurality of conductors 106,108,110,112 either together or to ground (e.g., as shown with conductor 112), in order to create an arc within the envelope 104 which is electrically in parallel to an arc fault causing the arc fault internal to switchgear (not shown) to be extinguished.

Although not required, the various gaps, such as 114,116, 118,120,122 meet BIL spacing requirements. The example triggered arc flash arrester 102 can be encapsulated in a suitable insulator, such as the example polyurethane molding 136 (partially shown for convenience of illustration), for increased BIL.

The example triggered arc flash arrester 102 employs the single envelope 104 for three phases (e.g., phases A, B and C) on the three conductors 108,110,106 and ground 126 on the conductor 112, although any of the conductors 106,108,110, 112 can be grounded. The envelope 104 can support a suitable partial vacuum, a pressure less than about 1.33 Pa, or a pressure greater than 0.10857 MPa (e.g., without limitation, 5 atmospheres). The conductors 106,108,110,112 can be fixed or stationary, or one of the conductors 108 or 112 can be movable (e.g., as in a vacuum switch or vacuum interrupter). For example, all of the conductors 106,108,110,112 being fixed provides for no moving parts, high speed operation and reliability. In the example embodiment, the triggered gap 124 is partially disposed within conductor 112, with a trigger electrode 130 exiting the envelope 104. The purpose of the shield 128 is to prevent metal deposition on the inside wall of the envelope 104 (e.g., without limitation, a ceramic bottle). If, for example, metal was deposited on the inside wall, then the envelope 104 might short out.

In this example, the conductors 106,108,110,112 include example tungsten contact surfaces 106',108',110',112', respectively, brazed onto these conductors. These advantageously extend the contact life and reduce metal vapor deposits. The shield 142 of the conductors 106,110 has a step shape that creates a "shadow" over the ceramic tube 150, in order to prevent undesired metal deposition over the ceramic surface thereof.

The example conductors 106,108,110,112 and the shield 128 in the cross sectional view of FIG. 2 are in cylindrical rotation in the triggered arc flash arrester 102.

Figure 3:
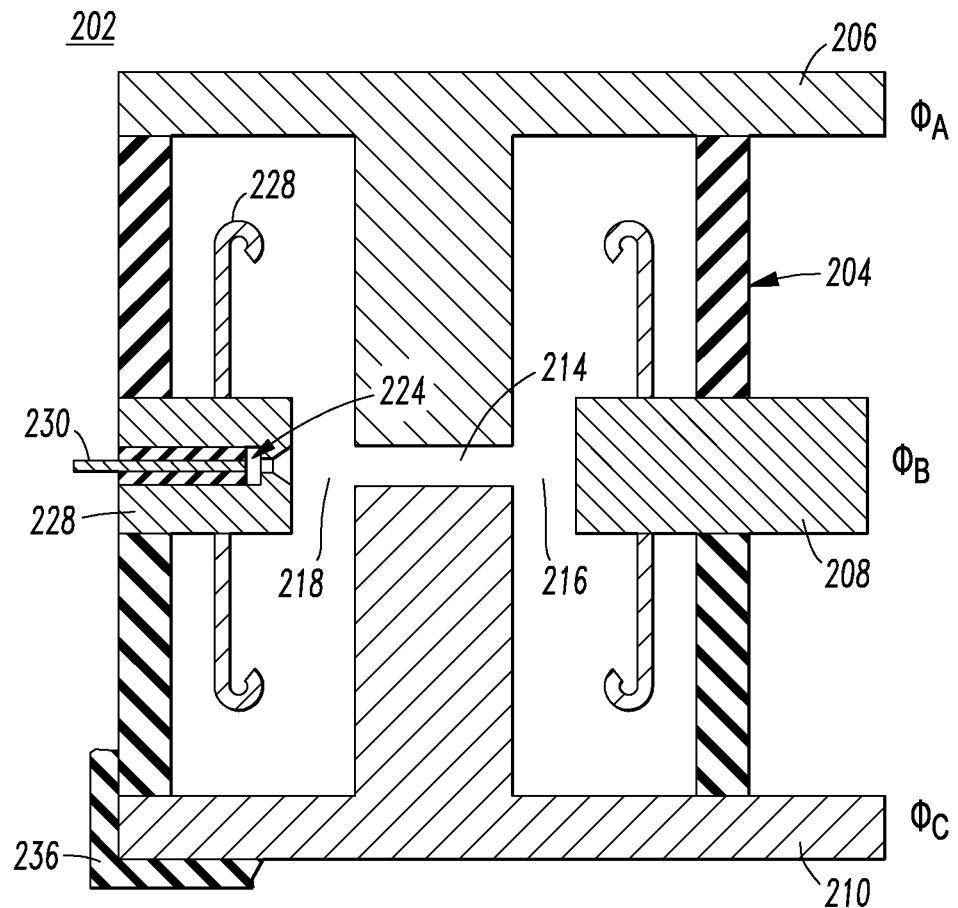
FIG. 3 is a cross sectional view of a single envelope, three-phase, shield triggered arc flash arrester in accordance with another embodiment of the disclosed concept.

FIG. 3 shows another triggered arc flash arrester 202 including an envelope 204 structured to operate at: (a) a pressure (e.g., without limitation, about $10^{-7}$ Torr; a partial vacuum) less than about 1.33 Pa (about $10^{-2}$ Torr); or (b) a pressure greater than 0.10857 MPa (about 815 Torr). A plurality of conductors 206,208,210 are partially disposed within the envelope 204. A number of gaps, such as 214,216, are disposed between the conductors 206,208,210 within the envelope 204. A shorting structure, such as a triggered gap 224, is operatively associated with (e.g., disposed in suitable proximity to) the number of gaps. The shorting structure, as will be described, is structured to electrically short the plurality of conductors 206,208,210 together, in order to create an arc within the envelope 204 which is electrically in parallel to an arc fault causing the arc fault internal to switchgear (not shown) to be extinguished.

Although not required, the various gaps, such as 214,216, 218 meet BIL spacing requirements. The example triggered arc flash arrester 202 can be encapsulated in a suitable insulator, such as the example polyurethane molding 236 (partially shown for convenience of illustration), for increased BIL.

The example triggered arc flash arrester 202 employs the single envelope 204 for three phases (e.g., phases A, B and C) on the three conductors 206,208,210. The envelope 204 can support a suitable partial vacuum, a pressure less than about 1.33 Pa, or a pressure greater than 0.10857 MPa (e.g., without limitation, 5 atmospheres). The conductors 206,208,210 in this example are fixed or stationary. This provides for no moving parts, high speed operation and reliability. In the example embodiment, the triggered gap 224 is partially disposed within shield conductor 228, with a trigger electrode 230 exiting the envelope 204. The purpose of the shield 228 is to prevent metal deposition on the inside wall of the envelope 204 (e.g., without limitation, a ceramic bottle). If, for example, metal was deposited on the inside wall, then the envelope 204 might short out.

The shields 28,128,228 of FIGS. 1-3 also grade the electric field, thereby improving the breakdown characteristic of the respective triggered arc flash arresters 2,102,202.

Figure 4:
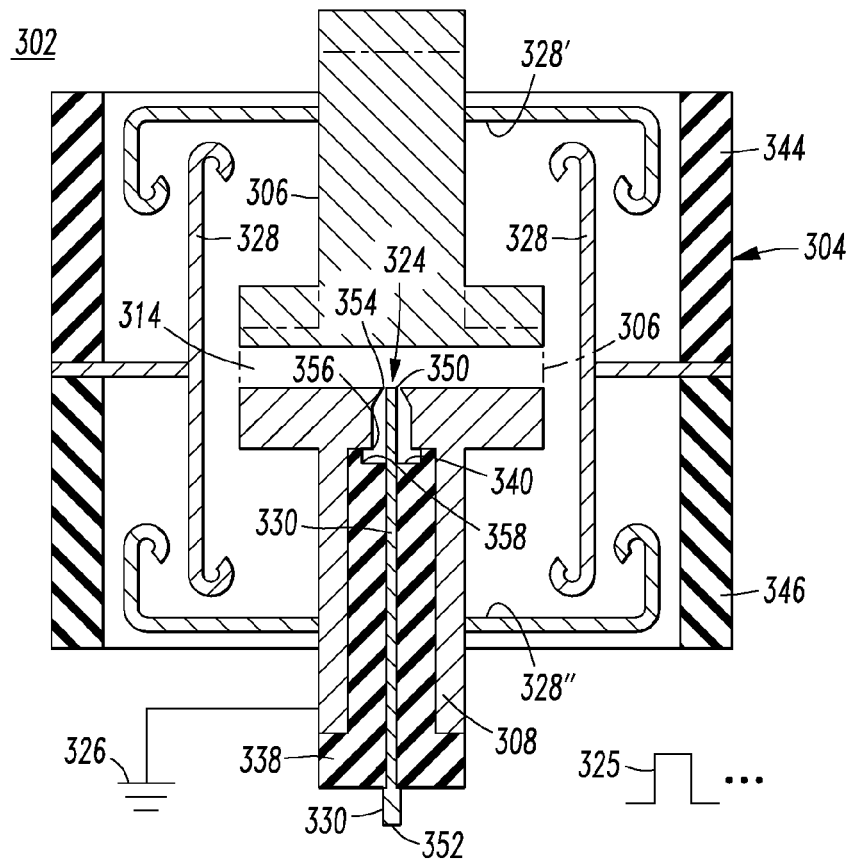
FIG. 4 is a cross sectional view of a single phase, electrode triggered arc flash arrester in accordance with another embodiment of the disclosed concept.

Referring to FIG. 4, a single phase, electrode triggered arc flash arrester 302 is shown. The triggered arc flash arrester 302 includes an envelope 304 structured to operate at: (a) a pressure (e.g., without limitation, about $10^{-7}$ Torr; a partial vacuum) less than about 1.33 Pa (about $10^{-2}$ Torr); or (b) a pressure greater than 0.10857 MPa (about 815 Torr). A plurality of conductors 306,308 are partially disposed within the envelope 304. A number of gaps, such as 314 are disposed between the conductors 306,308 within the envelope 304. A shorting structure, such as a triggered gap 324, is operatively associated with (e.g., disposed in suitable proximity to) the number of gaps. The shorting structure, as will be described, is structured to electrically short the plurality of conductors 306,308 together, in order to create an arc within the envelope 304 which is electrically in parallel to an arc fault causing the arc fault internal to switchgear (not shown) to be extinguished.

The envelope 304 can support a suitable partial vacuum, a pressure less than about 1.33 Pa, or a pressure greater than 0.10857 MPa (e.g., without limitation, 5 atmospheres). The conductors 306,308 can be fixed or stationary, or one of the conductors 306 or 308 can be movable (e.g., as in a vacuum switch or vacuum interrupter). For example, all of the conductors 306,308 being fixed provides for no moving parts, high speed operation and reliability. In the example embodiment, the triggered gap 324 is partially disposed within the conductor 308, with a trigger electrode 330 exiting the envelope 304. The purpose of the shields 328,328',328" is to prevent metal deposition on the inside wall of the envelope 304 (e.g., without limitation, a ceramic bottle). If, for example, metal was deposited on the inside wall, then the envelope 304 might short out.

The example triggered arc flash arrester 302 can be employed, for example and without limitation, for medium voltage application. A short to ground 326 is created when the triggered gap 324 or triggered spark gap is triggered electronically. The spark causes ionization which, in turn, causes the number of gaps, such as 314, to breakdown thereby grounding the single phase on conductor 306 to the ground 326 on the other conductor 308. The metal vapor ions between the main gap 314 causes it to breakdown.

The example conductors 306,308 and the shields 328,328', 328" in the cross sectional view of FIG. 4 are in cylindrical rotation in the triggered arc flash arrester 302. The shield 328 is not electrically connected to any potential (e.g., ground; the single phase voltage). In this example, shield 328" is at ground potential of conductor 308, and shield 328' is at the potential of the other conductor 306.

The triggered gap 324 is structured to be actuated by a number of voltage pulses 325 applied between the trigger electrode 330 and the ground 326 and have a voltage magnitude structured to breakdown the triggered gap 324.

Although not required, as will be discussed below, the main gap 314, for example, meets BIL spacing requirements. The example triggered arc flash arrester 302 can be encapsulated in a suitable insulator, such as an example polyurethane molding (not shown), for increased BIL.

The conductors 306,308 can be any suitable conductor (e.g., without limitation, copper-chrome; HC (high conductivity) copper; tungsten; copper; copper-tungsten; steel; an electrode of differing material on a copper conductor).

The envelope 304 is formed by a number of cylindrical insulators (e.g., without limitation, ceramic) 344,346, which are brazed to the conductors 306,310 (or end caps of the envelope 304) at each end.

The example envelope 304 also includes a ceramic tube 338 having a ceramic surface 340 therein. The ceramic tube 338 insulates the conductor 308 from the trigger electrode 330 (e.g., without limitation, tungsten). The conductor 308 preferably has a shape proximate the triggered gap 324 structured to prevent metal deposition on the ceramic surface 340 within the envelope 304, which otherwise could short the trigger electrode 330 to the conductor 308. The electrode 330 is elongated and has a first end 350 and an opposite second end 352. The conductor 308 has a first opening 354 proximate the first end 350 and proximate the other conductor 306, and a second opening 356, larger than the first opening 354, proximate the insulator 338 disposed between the elongated electrode 330 and the conductor 308. The insulator 338 has a third opening 358, larger than and proximate the second opening 356. This structure prevents metal deposition on the insulator surface 340 within the envelope 304 between the elongated electrode 330 and the conductor 308. As shown, the example openings 356,358 form an inverted T-shape.

For example and without limitation, for reliable triggering, the number of voltage pulses 325 have a negative polarity as applied to the trigger electrode 330 with respect to ground 326 with a magnitude of about $-25$ kV$_{PEAK}$. Within the above stated pressure ranges, the pressure in the envelope 304 is believed to be no significant factor in trigger reliability. Preferably, however, a plurality of the voltage pulses 325 can be employed for increased reliability.

Figures 5, 6, 7:
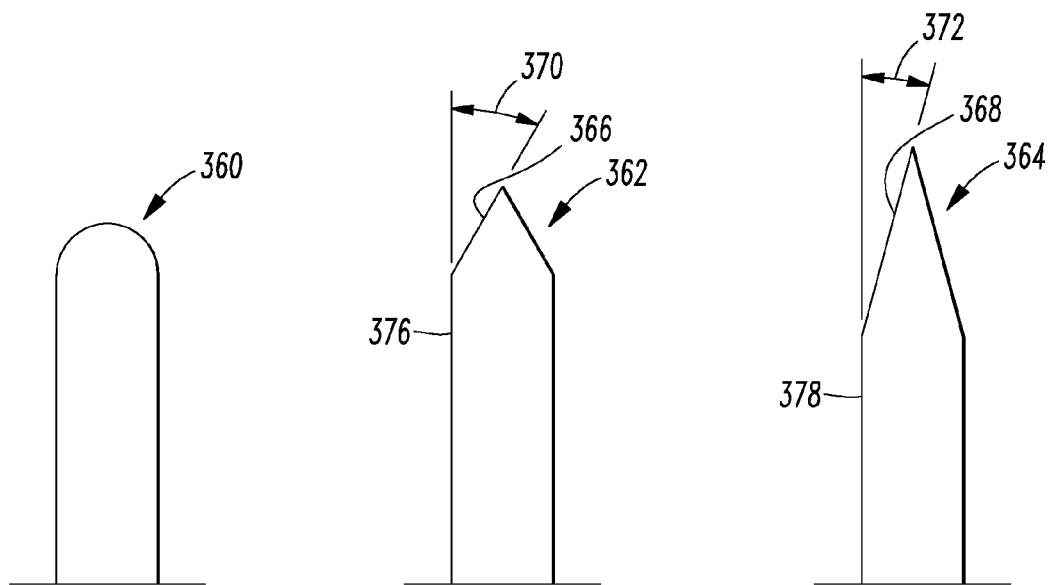
FIGS. 5-7 are vertical elevation views of other electrode profiles for the triggered arc flash arrester of FIG. 4.

As shown in FIG. 4, the first end 350 of the trigger electrode 330 has a rectangular profile (i.e., the first end 350 is flat). Alternatively, as shown in FIGS. 5-7, a wide range of other suitable electrode profiles can be employed, such as, for example and without limitation, a rounded end 360 (FIG. 5) or a pointed end 362 (FIG. 6) or 364 (FIG. 7). The example pointed ends 362,364 are cones having a surface 366,368 disposed at an angle 370,372 with respect to the generally cylindrical shape 376,378, respectively, of the elongated electrode 330 (FIG. 4). For example, the angles 370,372 are between about 15 degrees and about 30 degrees. The rounded end 360 increases the desired magnitude of the number of voltage pulses 325 to >40 $kV_{PEAK}$ or <−40 $kV_{PEAK}$. The example pointed ends 362,364 are believed to decrease the desired magnitude of the number of voltage pulses 325.

Referring to FIGS. 8 and 9, a single phase, triggered arc flash arrester 402 is shown including a triggered spark gap 403 formed by a ring electrode 404 and one of two example conductors 406,408 (e.g., conductor 406 in this example). This arrester 402 can employ conventional vacuum interrupter components and assembly process, except for the ring electrode 404 and its assembly within the envelope 410. The example arrester 402 does not employ a shield, but employs conventional conductor stems 412,414 and conventional ceramic tubes 416,418 as well as a conventional sealing process. This greatly simplifies construction as compared to that of the arrester 302 of FIG. 4. In order to promote a spark from the triggered spark gap 403 proximate the gap 420 between the conductors 406,408, both of the upper (with respect to FIG. 8) edge 422 of the ring electrode 404 proximate the lower (with respect to FIG. 8) conductor 406 and the upper (with respect to FIG. 8) edge 424 of the lower (with respect to FIG. 8) conductor 406 employ squared off corners, whereas the lower (with respect to FIG. 8) edge 426 of the ring electrode 404 employs a rounded corner (e.g., without limitation, having a radius of about one-half of the thickness of the relatively thin ring electrode 404). As shown in FIGS. 8 and 9, the triggered gap 403 is formed by a gap between the ring electrode 404 and a cylindrical portion 428 of the conductor 406. The cylindrical portion 428 has a first planar surface 430, the other conductor 408 has a second planar surface 432 parallel to and proximate the first planar surface 430, and the ring electrode 404 has a third planar surface 434 co-planar with the first planar surface 430. The ring electrode 404 further has a fourth planar surface 436 parallel to the third planar surface 434. A cross section of the ring electrode 404 has the first square corner 422 at the third planar surface 434 and the rounded corner 426 at the fourth planar surface 436. A cross section of the cylindrical portion 428 of the conductor 406 has the second square corner 424 proximate the first square corner 422. The first and second square corners 422, 424 form part of the triggered gap 403.

For example and without limitation, for reliable triggering, a number of voltage pulses applied between a terminal 438 of the ring electrode 404 and ground (e.g., conductor stem 412 as it exits the envelope 410) has a negative polarity as applied to the terminal 438 with respect to ground with a magnitude of about −17 $kV_{PEAK}$. Alternatively, a positive polarity can be applied to the terminal 438 with respect to ground with a magnitude of about +26 $kV_{PEAK}$. Preferably, however, a plurality of voltage pulses can be employed for increased reliability.

Figure 10:
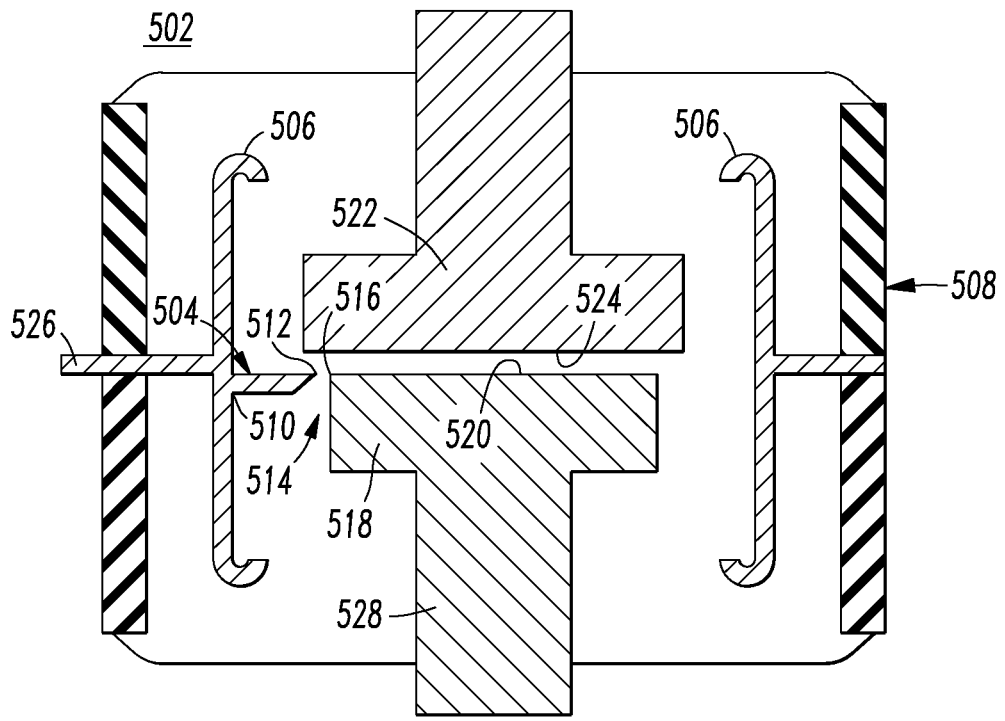
FIG. 10 is a cross sectional view of a single phase, shield triggered arc flash arrester including a trigger rod electrode in accordance with another embodiment of the disclosed concept.
Figure 11:
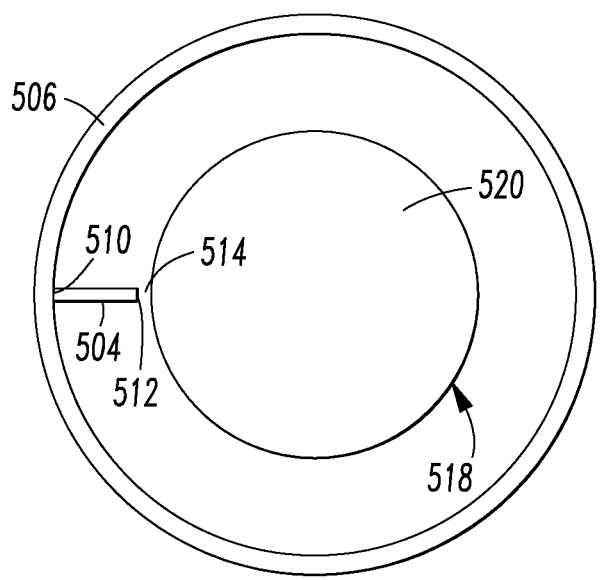
FIG. 11 is a plan view of the trigger rod electrode and lower conductor of FIG. 10.

FIG. 10 shows a single phase, shield triggered arc flash arrester 502 including a trigger rod electrode 504 (also shown in FIG. 11) electrically connected to shield 506 within envelope 508. The trigger rod electrode 504 has a first end 510 electrically connected to the shield 506 and an opposite second end 512. In this embodiment, the shorting structure is a triggered gap formed by a gap 514 between the trigger rod electrode opposite second end 512 and a portion 516 of lower (with respect to FIG. 10) conductor 518. The portion 516 of the conductor 518 has a first planar surface 520. The upper (with respect to FIG. 10) conductor 522 has a second planar surface 524 parallel to and proximate the first planar surface 520. The trigger rod electrode 504 is generally co-planar with the first planar surface 520. The trigger rod electrode opposite second end 512 is preferably a point proximate the lower (with respect to FIG. 10) conductor 518. The triggered gap 514 is formed by the point of the opposite second end 512 and the portion 516 of the lower (with respect to FIG. 10) conductor 518.

The example triggered arc flash arrester 502 can function, for example and without limitation, for a 38 kV system. Except for the trigger rod electrode 504 and external terminal 526, the envelope 508 can be the same as that for a conventional vacuum interrupter. As a further non-limiting example, the envelope 508 can be formed by a 5 inch diameter ceramic tube, and the conductors 518,522 can provide axial magnetic field (AMF) CuW contacts having a gap therebetween of about 13 mm. The conductors 518,522 can be fixed or stationary, or one of the conductors 518,522 can be movable (e.g., as in a vacuum switch or vacuum interrupter). A number of trigger voltage pulses can be applied between the terminal 526 and ground (e.g., conductor stem 528 as it exits the envelope 508).

Figure 12:
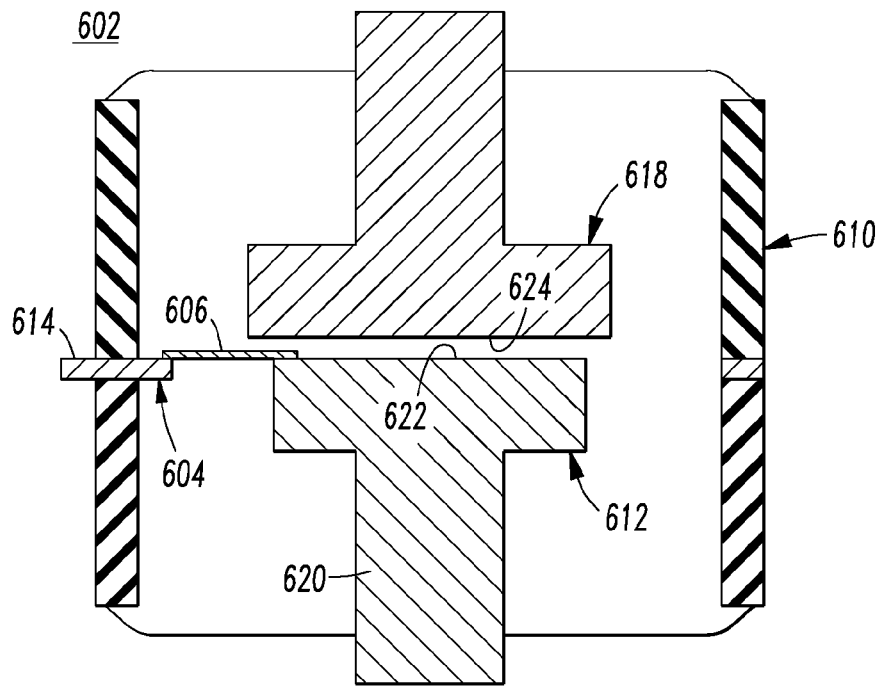
FIG. 12 is a cross sectional view of a single phase, fuse triggered arc flash arrester including a ring electrode and fuse in accordance with another embodiment of the disclosed concept.
Figure 13:
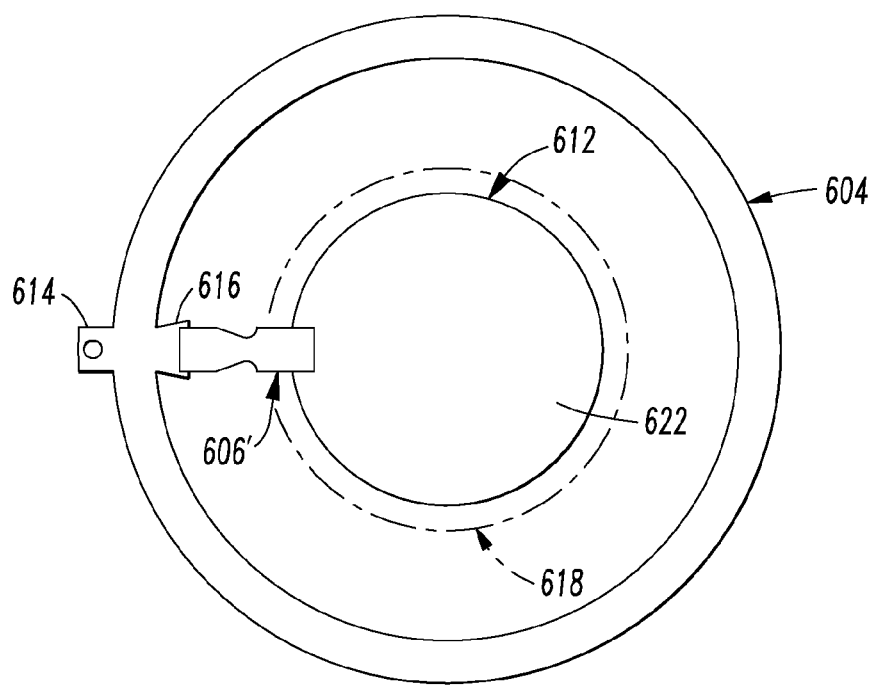
FIG. 13 is a plan view of the ring electrode, fuse ribbon and lower conductor of FIG. 12.
Figure 14:
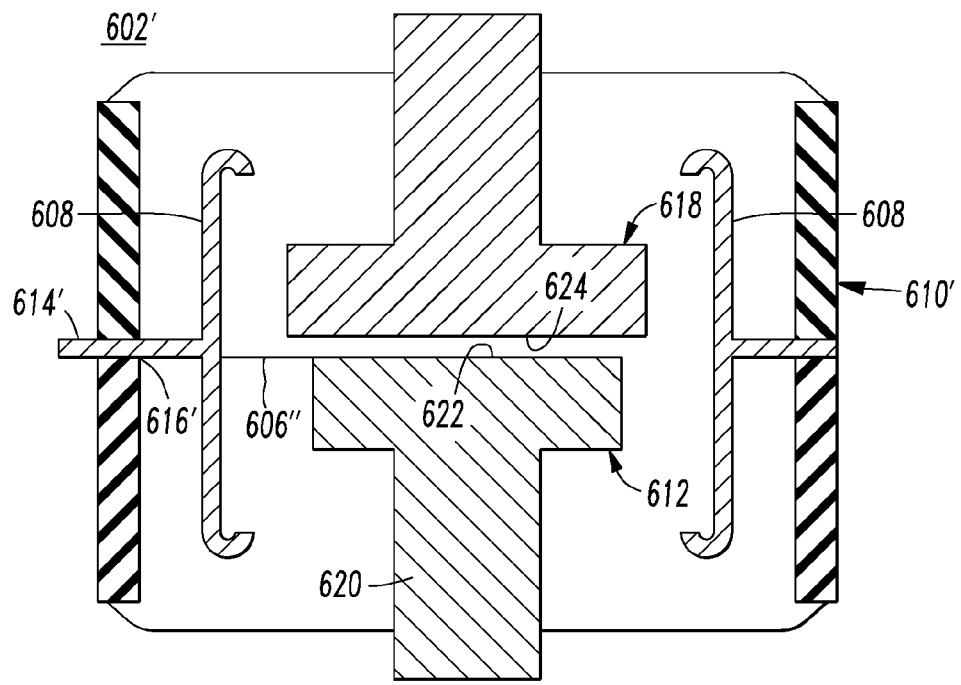
FIGS. 14 and 15 are cross sectional views of single phase, fuse triggered arc flash arresters including a fuse in accordance with other embodiments of the disclosed concept.
Figure 15:
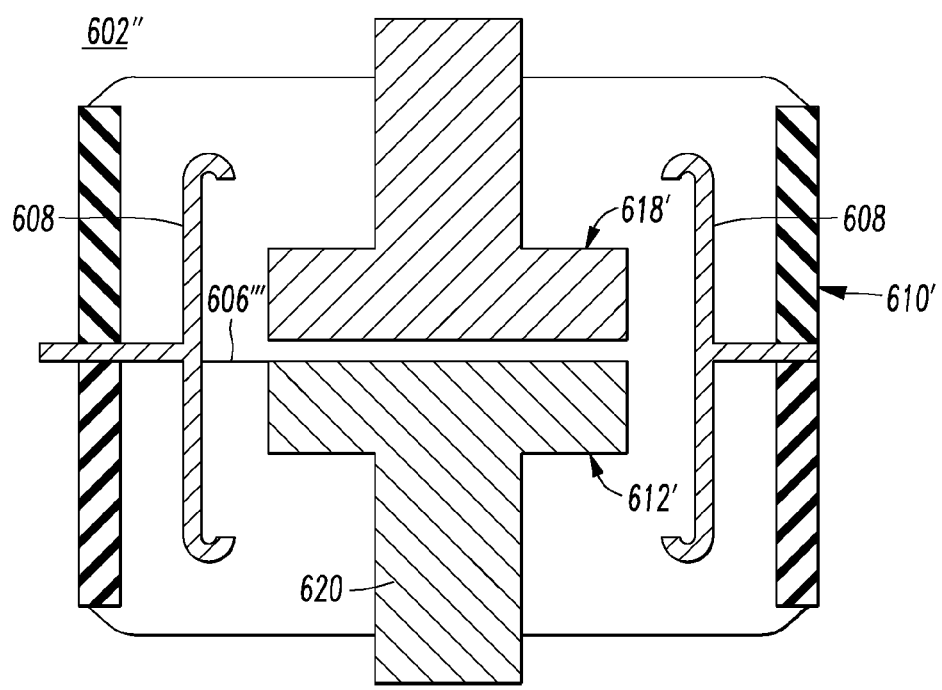

FIG. 12 shows a single phase, triggered arc flash arrester 602 including a ring electrode 604 (e.g., without limitation, made of stainless steel) and a fuse 606. The ring electrode 604 (also shown in FIG. 13) can be employed without a shield within envelope 610 as shown in FIG. 12, or the fuse 606 can be employed with a shield 608 as shown in FIGS. 14 and 15. In FIG. 12, the envelope 610 does not include a shield and the shorting structure is the fuse 606, which is electrically connected between the ring electrode 604 and the lower (with respect to FIG. 12) conductor 612. As shown in FIG. 13, the fuse 606 can be a fuse (e.g., without limitation, Ag) ribbon 606'. The ring electrode 604 has a first portion, such as terminal 614, disposed external to the envelope 610 and a second portion 616 disposed internal to the envelope 610 and electrically connected to the fuse 606 (FIG. 12) or 606' (FIG. 13).

In FIG. 14, a triggered arc flash arrester 602' includes an envelope 610' having the shield 608. The shorting structure in this embodiment is the fuse 606, which is electrically connected between the shield 608 and the lower (with respect to FIG. 12) conductor 612. In FIG. 14, the shield 608 has a first portion, such as terminal 614', disposed external to the envelope 610' and a second portion 616' disposed internal to the envelope 610' and electrically connected to the fuse 606.

The example triggered arc flash arresters 602,602' can function, for example and without limitation, for a low voltage or medium voltage system. Except for the ring electrode 604 and fuse 606, the envelopes 610,610' can be the same as that for a conventional vacuum interrupter with or without a shield. The lower (with respect to FIG. 12) conductor 612 and the upper (with respect to FIG. 12) conductor 618 (best shown in FIGS. 12 and 14; shown in phantom line drawing in FIG. 13) can be fixed or stationary, or one of the conductors 612, 618 can be movable (e.g., as in a vacuum switch or vacuum interrupter). A number of trigger voltage pulses can be applied between the terminal 614 or 614' and ground (e.g., conductor stem 620 as it exits the envelope 610 or 610'). Although a fuse ribbon 606' is shown in FIG. 13, the fuse 606 can be a fuse wire or fuse ribbon, or a fuse wire 606'',606''', as will be discussed, below, in connection with FIGS. 16-18. As a non-limiting example, about 4.5 J minimum energy would fuse a 0.127 mm diameter Ag wire with a 1450 $A_{PEAK}$ current pulse.

In FIGS. 12 and 14, the conductor 612 has a first cylindrical shape with a first planar surface 622, and the other conductor 618 has a second cylindrical shape with a second planar surface 624 parallel to and proximate the first planar surface 622. The fuse 606 (FIG. 12) is generally co-planar with the first planar surface 622, and the first cylindrical shape is smaller than the second cylindrical shape.

In FIG. 15, a triggered arc flash arrester 602" is generally the same as the triggered arc flash arrester 602' of FIG. 14, except that the cylindrical shapes of the conductors 612',618' are the same size.

Figure 16:
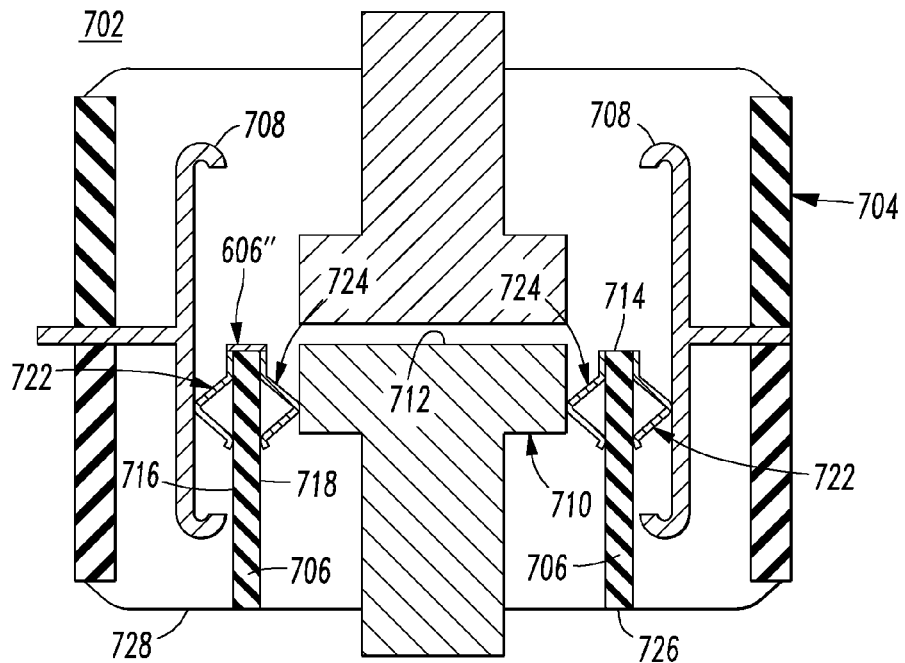
FIG. 16 is a cross sectional view of a single phase, shield triggered arc flash arrester including a ceramic cylinder and a fuse wire in accordance with another embodiment of the disclosed concept.

FIG. 16 shows a single phase, shield triggered arc flash arrester 702 including an envelope 704, an insulative (e.g., without limitation, ceramic) cylinder 706 and a fuse wire 606". The cylinder 706 is disposed within the envelope 704 between a shield 708 and the lower (with respect to FIG. 16) conductor 710, which has a cylindrical shape with a planar surface 712. The cylinder 706 has an annular end 714 parallel to the planar surface 712. The annular end 714 supports (e.g., without limitation, holds and locates) the fuse wire 606".

Figure 17:
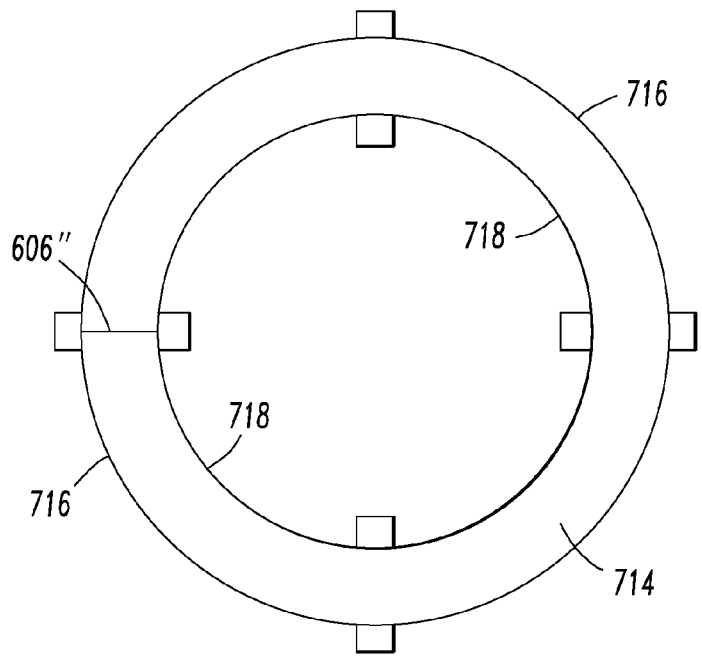
FIGS. 17 and 18 are plan views of fuse wires for the arc flash arrester of FIG. 16.

As shown in FIGS. 16 and 17, the annular end 714 has an outer edge 716 proximate the shield 708 and an inner edge 718 proximate the lower (with respect to FIG. 16) conductor 710. The fuse wire 606" is disposed in a linear segment directly between the outer edge 716 and the inner edge 718. In this embodiment, the length of the fuse wire 606" is relatively short.

Figure 18:
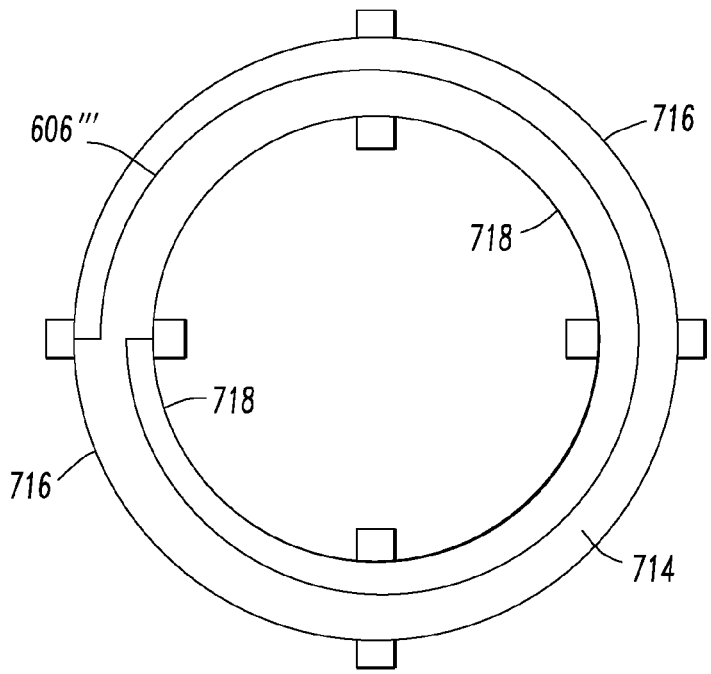

As shown in FIG. 18, another fuse wire 606" is disposed in a generally circular segment beginning at the outer edge 716, disposed over and around the annular end 714, and ends at the inner edge 718. In this embodiment, the length of the fuse wire 606" is relatively longer than the fuse wire 606" of FIG. 17, and, thus, can potentially provide a greater quantity of metal ions when fused in response to a suitable trigger current.

As shown in FIG. 16, the insulative cylinder 706 is supported by a first conductive member (e.g., without limitation, a conductive metal clip 722) disposed between the shield 708 and the outer edge 716 and a second conductive member (e.g., without limitation, a conductive metal clip 724) disposed between the inner edge 718 and the lower (with respect to FIG. 16) conductor 710. The conductive metal clip 722 is electrically connected to the shield 708, the conductive metal clip 724 is electrically connected to the conductor 710, and the fuse wire 606" is electrically connected between the conductive metal clips 722,724. The ends of the conductive metal clips 722,724 are brazed to the respective inner and outer edges 716,718 of the cylinder 706. The lower (with respect to FIG. 16) annular end 726 of the insulative cylinder 706 is brazed to the end cap 728 of the envelope 704.

Figure 19:
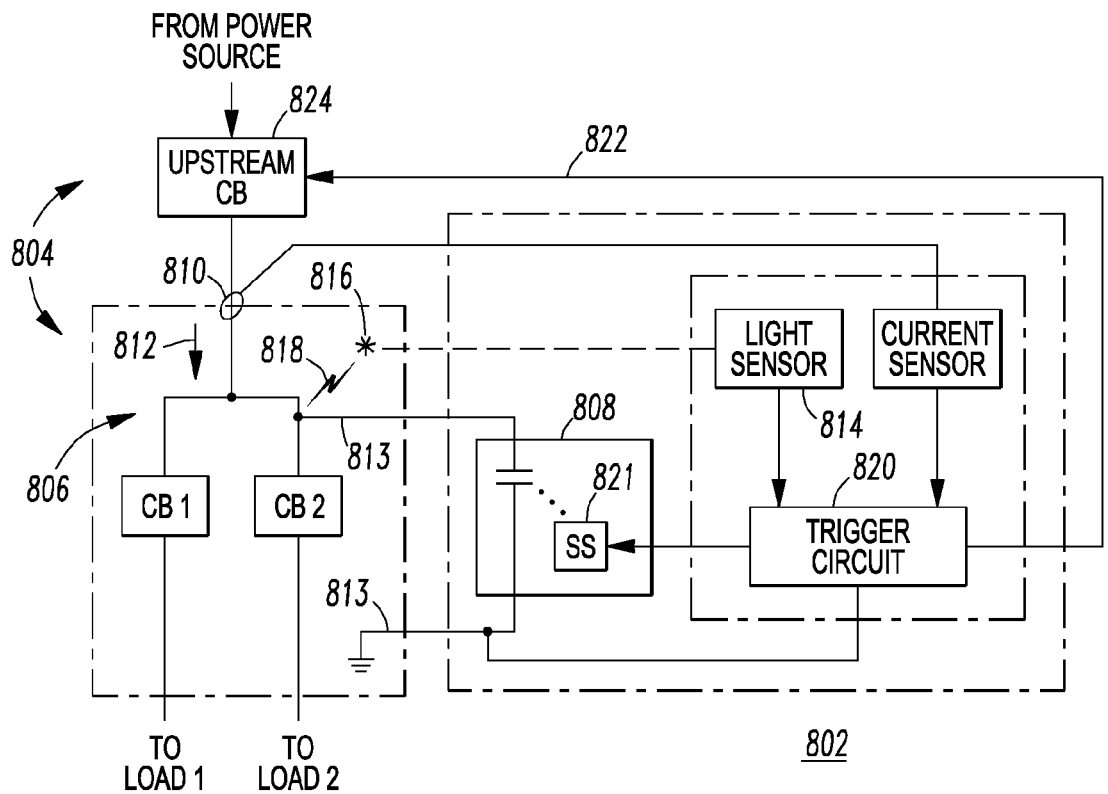
FIG. 19 is a block diagram of a switchgear system including a triggered arc flash arrester in accordance with another embodiment of the disclosed concept.

FIG. 19 shows a system 802 including switchgear 804 having a power circuit 806, and a triggered arc flash arrester 808 (e.g., any of the arc flash arresters 2,102,202,303,404, 505,602,602',602",702,902,1002 disclosed herein). A current sensor 810 senses current 812 flowing through the power circuit 806, which has a plurality of power conductors 813 corresponding to the conductors of the triggered arc flash arrester 808. A light sensor 814 senses light 816 operatively associated with an arcing fault 818 for the power circuit 806. A trigger circuit 820 triggers the shorting structure 821 of the triggered arc flash arrester 808 when the sensed current is greater than a first predetermined threshold and when the sensed light is greater than a second predetermined threshold. In turn, a signal 822 is sent to an upstream circuit breaker 824, which is operatively associated with the power circuit 806, to open in order to take the system 802 offline.

FIG. 20 shows a single phase, floating shield, triggered arc flash arrester 902 including a trigger rod electrode 904 (also shown in FIG. 21) electrically isolated from shield 906 within envelope 908. The trigger rod electrode 904 has a first end 910 and an opposite second end 912. In this embodiment, the shorting structure is a triggered gap formed by a gap 914 between the trigger rod electrode opposite second end 912 and a portion 916 of lower (with respect to FIG. 20) conductor 918. The portion 916 of the conductor 918 has a first planar surface 920. The upper (with respect to FIG. 20) conductor 922 has a second planar surface 924 parallel to and proximate the first planar surface 920. The trigger rod electrode 904 is generally co-planar with the first planar surface 920. The trigger rod electrode opposite second end 912 is preferably a point proximate the lower (with respect to FIG. 20) conductor 918. The triggered gap 914 is formed by the point of the opposite second end 912 and the portion 916 of the lower (with respect to FIG. 20) conductor 918.

An example ceramic cylinder 930 isolates the shield 906 from the trigger rod electrode 904. Preferably, the outside of the envelope 908 is potted to prevent breakdown along, for example, the ceramic of the envelope 908 between the shield 906 and metal ring 932. An opening 934 (e.g., without limitation, about a 15 mm diameter hole) in the shield 906 allows the trigger rod electrode 904 to be isolated from the shield 906 in, for example and without limitation, a partial vacuum. This configuration results in a relatively more uniform electric field between the contacts for improved BIL.

The example triggered arc flash arrester 902 can function, for example and without limitation, for a 38 kV system. Except for the trigger rod electrode 904, example ceramic cylinder 930, metal ring 932, opening 934, and external terminal 926, the envelope 908 can be the same as that for a conventional vacuum interrupter. As a further non-limiting example, the envelope 908 can be formed by a 5 inch diameter ceramic tube, and the conductors 918,922 can provide axial magnetic field (AMF) CuW contacts having a gap therebetween of about 13 mm. The conductors 918,922 can be fixed or stationary, or one of the conductors 918,922 can be movable (e.g., as in a vacuum switch or vacuum interrupter). A number of trigger voltage pulses can be applied between the terminal 926 and ground (e.g., conductor stem 928 as it exits the envelope 908).

Figure 22:
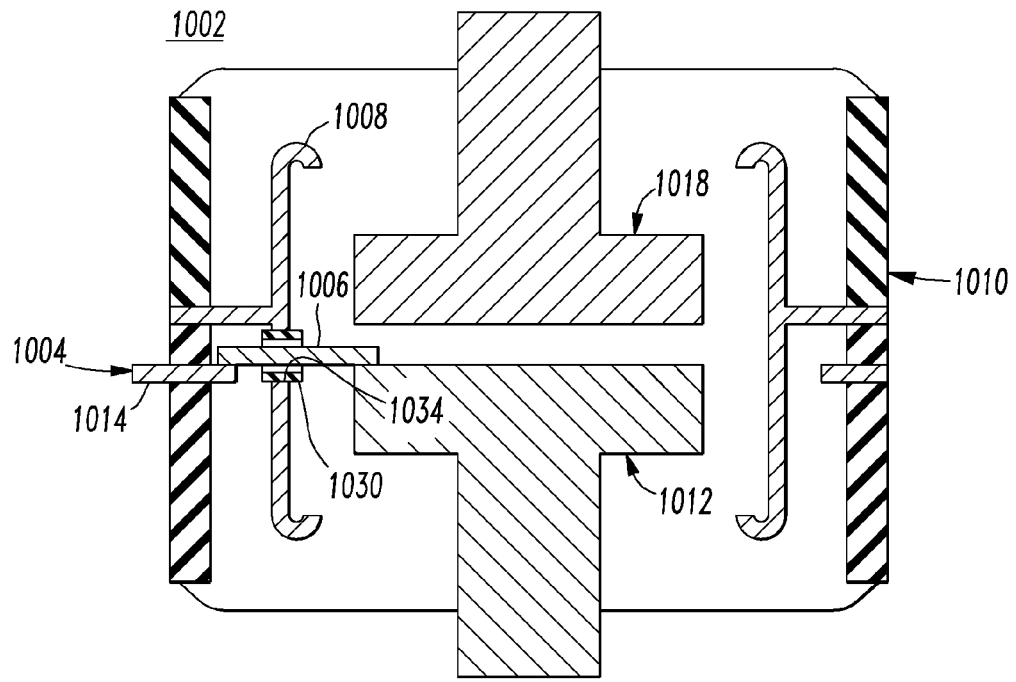
FIG. 22 is a cross sectional view of a single phase, floating shield, triggered arc flash arrester including a ring electrode and fuse in accordance with another embodiment of the disclosed concept.
Figure 23:
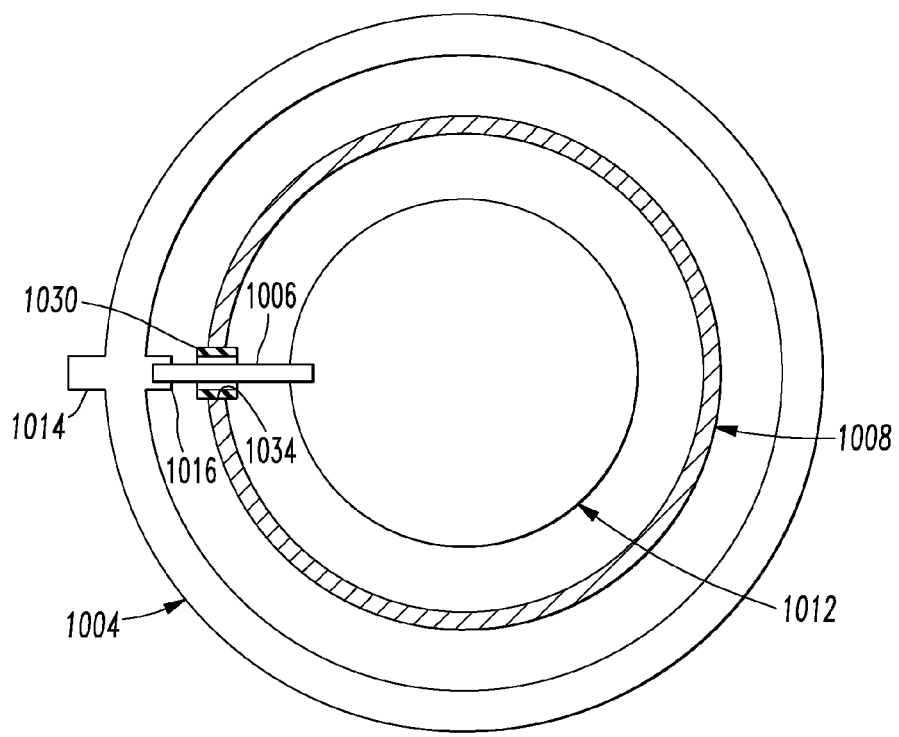
FIG. 23 is a plan view of the ring electrode, floating shield, fuse and lower conductor of FIG. 22.

FIG. 22 shows a single phase, floating shield, triggered arc flash arrester 1002 including a ring electrode 1004 (e.g., without limitation, made of stainless steel) and a fuse 1006. The ring electrode 1004 (also shown in FIG. 23) can be employed without a shield (not shown) within envelope 1010, or the fuse 1006 can be employed with the shield 1008 as shown in FIGS. 22 and 23. In FIG. 22, the envelope 1010 includes the shield 1008 and the shorting structure is the fuse 1006, which is electrically connected between the ring electrode 1004 and the lower (with respect to FIG. 22) conductor 1012. An upper (with respect to FIG. 22) conductor 1018 is opposite the other conductor 1012. As shown in FIG. 23, the fuse 1006 can be a fuse (e.g., without limitation, Ag) ribbon, as shown, or a fuse wire (not shown). The ring electrode 1004 has a first portion, such as terminal 1014, disposed external to the envelope 1010 and a second portion 1016 disposed internal to the envelope 1010 and electrically connected to the fuse 1006.

An example ceramic cylinder 1030 isolates the shield 1008 from the fuse 1006. Preferably, the outside of the envelope 1010 is potted to prevent breakdown along, for example, the ceramic of the envelope 1010 between the shield 1008 and the metal ring 1004. An opening 1034 (e.g., without limitation, about a 15 mm diameter hole) in the shield 1008 allows the fuse 1006 to be isolated from the shield 1008 in, for example and without limitation, a partial vacuum. This configuration results in a relatively more uniform electric field between the contacts for improved BIL.

A three-phase system, for example, can employ one of the three-phase devices of FIGS. 1-3, or three of the single-phase devices of FIGS. 4-18 and 20-23. For the three single-phase devices, triggers could be activated on all three devices simultaneously or optionally, for phase-to-ground faults, on the individual phase of the corresponding phase-to-ground fault. Preferably, the circuit driving the trigger(s) floats at line potential and withstands BIL.

Although example flat, planar contact surfaces are shown, any suitable vacuum interrupter contact surface can be employed (e.g., without limitation, spiral). For example and without limitation, contact and shield materials and contact and shield geometry depend on desired current and voltage ratings.

Although medium voltage trigger applications are disclosed, low voltage trigger applications can be employed with suitable changes to geometry spacing since BIL and rated voltages are much lower. As a result, the energy employed to trigger the triggered gap would be reduced.

Suitable trigger energy is employed to breakdown a partial vacuum triggered gap at an arcing voltage. When a switchgear arcing fault occurs, the voltage across the partial vacuum contacts, corresponding to the phase (e.g., one of three phases; a single phase) with the arcing fault, will have a significantly lower voltage across the contact gap as compared to the system voltage. The plasma energy produced from the triggered gap is sufficient to breakdown the main contact gap with this reduced voltage.

As non-limiting examples for FIGS. 1-11, triggered gap energies of between about 0.37 J to about 5.1 J are employed with typical values of about 30 kV 100 A with a 400 ns voltage rise time and a 5 μs current pulse width. This is for a main gap separation of 13 mm with main gap voltages ranging from 250 V to 2000 V. With a main gap of about 10 mm and a main gap voltage of about 1 kV, trigger pulses of about 420 kV 80 A with a 0.4 μs rise time and a 6 μs pulse width are employed.

Preferably, the main contact gap is optimized. However, with a relatively larger gap, the greater the trigger energy needed to breakdown the main gap. An optimal gap is employed based on contact materials, contact diameter, contact gap, and surface condition. For example and without limitation, main gaps could range from about 2 mm to about 25 mm.

The main contact gap spacing is preferably reduced as much as possible. For vacuum interrupters (VIs), the limiting factor is generally not the system voltage but rather the BIL voltage requirement. However, the disclosed triggered arc flash arrester application is not an isolating switch but rather functions as a crowbar device. Hence, it is feasible to reduce the main contact gap to a distance that will breakdown at a BIL value lower than is typically required of VIs while maintaining BIL requirements on the external parts of the assembly. If, for example, a lightning strike occurred on a switchgear system, the impulse current would be diverted through the triggered arc flash arrester. This would serve two desirable purposes. One, the relatively smaller main gap would require relatively less shorting structure (e.g., triggered gap) energy to breakdown the main gap. Second, the triggered arc flash arrester could serve a dual purpose as a lightning protection system.

One problem that might be encountered during switching is metal deposition on the insulator (e.g., without limitation, ceramic) that surrounds the trigger electrode, which cannot become shorted out, unless the triggered arc flash arrester is intended for operation in a single arc flash event. Preferably, the insulator can either be recessed from a direct line of sight at the triggered gap, thereby shielding the insulator, or can be a recessed insulator hidden behind a step formed by the conductive contact in order to shield the insulator. Non-limiting examples are shown in FIGS. 1-4. The trigger electrode may be electrically connected to the shield inside the envelope.

The triggered arc flash arresters disclosed herein can employ solely fixed contacts, or fixed and movable contacts. If movable vacuum contacts are employed, these may advantageously be employed to close the contacts to create a bolted fault on the system in order to reduce the stress on the vacuum switch. See, for example, the closed contact position of conductor 306 (shown in phantom line drawing in FIG. 4) and conductor 308. Otherwise, if two or more fixed contacts are employed, these will conduct until the energy from the source is depleted (e.g., a capacitor bank discharge) or an upstream circuit breaker is commanded to open.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A triggered arc flash arrester comprising:
an envelope structured to operate at: a pressure less than about 1.33 Pa; or a pressure greater than 0.10857 MPa;
a plurality of conductors partially disposed within said envelope;
a number of gaps disposed between said plurality of conductors within said envelope; and
a shorting structure selected from the group consisting of a triggered gap and a fuse,
wherein said shorting structure is operatively associated with said number of gaps, and
wherein said shorting structure is structured to electrically short said plurality of conductors either together or to ground, in order to create an arc within said envelope which is electrically in parallel to an arc fault causing the arc fault internal to switchgear to be extinguished,
wherein said shorting structure comprises one of said plurality of conductors and an electrode disposed within and insulated from said one of said plurality of conductors, wherein said electrode is an elongated electrode having a first end and an opposite second end, wherein said one of said plurality of conductors has a first opening proximate the first end of said elongated electrode and proximate another one of said plurality of conductors, and a second opening, larger that than the first opening, proximate an insulator disposed between said elongated electrode and said one of said plurality of conductors, and wherein said insulator has a third opening, larger than and proximate the second opening, in order to prevent metal deposition on a surface of said insulator within said envelope between said elongated electrode and said one of said plurality of conductors.

2. The triggered arc flash arrester comprising:
an envelope structured to operate at; a pressure less than about 1.33 Pa; or a pressure greater than 0.10857 MPa;
a plurality of conductors partially disposed within said envelope;
a number of gaps disposed between said plurality of conductors within said envelope; and
a shorting structure comprising a triggered gap,
wherein said shorting structure is operatively associated with said number of gaps, and
wherein said shorting structure is structured to electrically short said plurality of conductors either together or to ground, in order to create an arc within said envelope which is electrically in parallel to an arc fault causing the arc fault internal to switchgear to be extinguished, wherein said triggered gap is formed by one said plurality of conductors and an electrode disposed within said insulated from said one of said plurality of conductors, wherein said electrode is an elongated electrode having a first end and an opposite second end, wherein said one of said plurality of conductors has a first opening proximate the first end of said elongated electrode and proximate another one of said plurality of conductors, and a second opening, larger than the first opening, proximate an insulator disposed between said elongated electrode and said one of said plurality of conductors, and wherein said insulator has a third opening, larger than and proximate the second opening, in order to prevent metal deposition on a surface of said insulator within said envelope between said elongated electrode and said one of said plurality of conductors.

3. The triggered arc flash arrester of claim 2 wherein the first end of said elongated electrode has a profile selected from the group consisting of a rounded end, a flat end and a pointed end.

4. The triggered arc flash arrester of claim 3 wherein said elongated electrode has a generally cylindrical shape; wherein said pointed end is a cone having a surface disposed at an angle with respect to the generally cylindrical shape of said elongated electrode; and wherein said angle is between about 15 degrees and about 30 degrees.

5. A triggered arc flash arrester comprising:
an envelope structured to operate at; a pressure less than about 1.33 Pa; or a pressure greater than 0.10857 MPa;
a plurality of conductors partially disposed within said envelope;
a number of gaps disposed between said plurality of conductors within said envelope; and
a shorting structure comprising a triggered gap,
wherein said shorting structure is operatively associated with said number of gaps, and
wherein said shorting structure is structured to electrically short said plurality of conductors either together or to ground, in order to create an arc within said envelope which is electronically in parallel to an arc fault causing the arc fault internal to switchgear to be extinguished, wherein said envelope comprises a ring electrode, wherein said triggered gap is formed by a gap between said ring electrode and a cylindrical portion of one of said plurality of conductors, wherein the cylindrical portion of said one of said plurality of conductors has a first planar surface, wherein another one of said plurality of conductors has a second planar surface parallel to and proximate the first planar surface, wherein said ring electrode has third planar surface co-planar with the first planar surface, wherein said ring electrode further has a fourth planar surface parallel to the third planar surface, wherein a cross section of said ring electrode has a first square corner at the third planar surface and a rounded corner at the fourth planar surface, wherein a cross section of the cylindrical portion of said one of said plurality of conductors has a second square corner proximate the first square corner, and wherein said first and second square corners form part of said triggered gap.

6. A triggered arc flash arrester comprising:
an envelope structured to operate at; a pressure less than about 1.33 Pa; or a pressure greater than 0.10857 MPa;
a plurality of conductors partially disposed within said envelope;
a number of gaps disposed between said plurality of conductors within said envelope; and
a shorting structure comprising a triggered gap,
wherein said shorting structure is operatively associated with said number of gaps, and
wherein said shorting structure is structured to electrically short said plurality of conductors either together or to ground, in order to create an arc within said envelope which is electrically in parallel to an arc fault causing the arc fault internal to switchgear to be extinguished, wherein said envelope comprises a shield and a trigger rod electrode having a first end electrically connected to an interior wall of said shield and an opposite second end, said trigger rod electrode extending inwardly within said shield and away from said interior wall, and wherein said triggered gap is formed by a gap between the opposite second end of said trigger rod electrode and a portion of one of said plurality of conductors.

7. The triggered arc flash arrester of claim 6 wherein the portion of said one of said plurality of conductors has a first planar surface; wherein another one of said plurality of conductors has a second planar surface parallel to and proximate the first planar surface; wherein said trigger rod electrode is generally co-planar with the first planar surface; wherein the opposite second end of said trigger rod electrode is a point proximate said one of said plurality of conductors; and wherein said triggered gap is formed by a gap between the point of the opposite second end of said trigger rod electrode and a portion of the first planar surface of said one of said plurality of conductors.

8. A triggered arc flash arrester comprising:
an envelope structured to operate at; a pressure less than about 1.33 Pa; or a pressure greater than 0.10857 MPa;
a plurality of conductors partially disposed within said envelope;
a number of gaps disposed between said plurality of conductors within said envelope; and
a shorting structure comprising a fuse,
wherein said shorting structure is operatively associated with said number of gaps, and
wherein said shorting structure is structured to electrically short said plurality of conductors either together or to ground, in order to create an arc within said envelope which is electrically in parallel to an arc fault causing the arc fault internal to switchgear to be extinguished, wherein said envelope comprises a ring electrode encircling said plurality of conductors and having a first portion disposed external to said envelope and a second portion disposed internal to said envelope; and wherein said fuse is electrically connected between said ring electrode and one of said plurality of conductors.

9. A triggered arc flash arrester comprising:
an envelope structured to operate at; a pressure less than about 1.33 Pa; or a pressure greater than 0.10857 MPa;
a plurality of conductors partially disposed within said envelope;
a number of gaps disposed between said plurality of conductors within said envelope; and
a shorting structure comprising a triggered fuse,
wherein said shorting structure is operatively associated with said number of gaps, and
wherein said shorting structure is structured to electrically short said plurality of conductors either together or to ground, in order to create an arc within said envelope which is electrically in parallel to an arc fault causing the arc fault internal to switchgear to be extinguished, wherein said envelope comprises a shield, wherein said fuse is electrically connected between said shield and one of said plurality of conductors, wherein said one of said plurality of conductors has a first cylindrical shape with a first planar surface, wherein another one of said plurality of conductors has a second cylindrical shape with a second planar surface parallel to and proximate the first planar surface, wherein said fuse is generally co-planar with the first planar surface; and wherein the first cylindrical shape is smaller than the second cylindrical shape.

10. A triggered arc flash arrester comprising:
an envelope structured to operate at; a pressure less than about 1.33 Pa; or a pressure greater than 0.10857 MPa;
a plurality of conductors partially disposed within said envelope;
a number of gaps disposed between said plurality of conductors within said envelope; and
a shorting structure comprising a triggered fuse,
wherein said shorting structure is operatively associated with said number of gaps, and
wherein said shorting structure is structured to electrically short said plurality of conductors either together or to ground, in order to create an arc within said envelope which is electrically in parallel to an arc fault causing the arc fault internal to switchgear to be extinguished, wherein said envelope comprises a shield, wherein said fuse is electrically connected between said shield and one of said plurality of conductors, wherein said one of said plurality of conductors has a first cylindrical shape with a first size and a first planar surface, wherein another one of said plurality of conductors has a second cylindrical shape with a second size and a second planar surface parallel to and proximate the first planar surface, wherein said fuse is generally co-planar with the first planar surface, and wherein the first size is the same as the second size.

11. A triggered arc flash arrester comprising:
an envelope structured to operate at; a pressure less than about 1.33 Pa; or a pressure greater than 0.10857 MPa;
a plurality of conductors partially disposed within said envelope;
a number of gaps disposed between said plurality of conductors within said envelope; and
a shorting structure comprising a triggered fuse,
wherein said shorting structure is operatively associated with said number of gaps, and
wherein said shorting structure is structured to electrically short said plurality of conductors either together or to ground, in order to create an arc within said envelope which is electrically in parallel to an arc fault causing the arc fault internal to switchgear to be extinguished, wherein said envelope comprises a shield, wherein said fuse is electrically connected between said shield and one of said plurality of conductors, wherein said envelope further comprises an insulative cylinder disposed therein between said shield and said one of said plurality of conductors, wherein said one of said plurality of conductors has a cylindrical shape with a planar surface; wherein said insulative cylinder has an annular end parallel to said planar surface; and wherein said annular end supports said fuse.

12. The triggered arc flash arrester of claim 11 wherein said annular end has an outer edge proximate said shield and an inner edge proximate said one of said plurality of conductors; and wherein said fuse is disposed in a linear segment directly between the outer edge and the inner edge.

13. The triggered arc flash arrester of claim 11 wherein said annular end has an outer edge proximate said shield and an inner edge proximate said one of said plurality of conductors; and wherein said fuse is disposed in a generally circular segment beginning at the outer edge, disposed over and around the annular end, and ending at the inner edge.

14. The triggered arc flash arrester of claim 11 wherein said annular end has an outer edge proximate said shield and an inner edge proximate said one of said plurality of conductors; wherein said insulative cylinder is supported by a first conductive member disposed between said shield and the outer edge and a second conductive member disposed between the inner edge and said one of said plurality of conductors; wherein said first conductive member is electrically connected to said shield; wherein said second conductive member is electrically connected to said one of said plurality of conductors; and wherein said fuse is electrically connected between said first conductive member and said second conductive member.

15. The triggered arc flash arrester of claim 2 wherein said plurality of conductors are three conductors structured to be energized by a three-phase medium voltage.

16. The triggered arc flash arrester of claim 2 wherein said envelope is a vacuum envelope structured to operate at the partial vacuum.

17. The triggered arc flash arrester of claim 2 wherein said envelope is structured to operate at the pressure less than about 1.33 Pa.

18. The triggered arc flash arrester of claim 2 wherein said triggered gap is structured to be actuated by a number of voltage pulses having a voltage magnitude structured to breakdown the triggered gap.

19. The triggered arc flash arrester of claim 18 wherein said envelope comprises a shield disposed within said envelope; and wherein said triggered gap is partially disposed within said shield.

20. The triggered arc flash arrester of claim 19 wherein said number of gaps are disposed between said plurality of conductors and between said shield and said plurality of conductors; and wherein said gaps meet BIL spacing requirements.

21. The triggered arc flash arrester of claim 2 wherein said triggered arc flash arrester is encapsulated in an insulator for increased BIL.

22. The triggered arc flash arrester of claim 2 wherein said plurality of conductors are four conductors for three phases and a ground; and wherein said four conductors are partially disposed within said envelope.

23. The triggered arc flash arrester of claim 2 wherein said envelope comprises a shield partially disposed within said envelope; wherein said triggered gap is partially disposed within said shield; and wherein said triggered gap includes a plasma exhaust disposed within said shield proximate said number of gaps and a trigger electrical connection disposed external to said envelope.

24. The triggered arc flash arrester of claim 2 wherein said envelope comprises a ceramic tube having a ceramic surface therein and a shield partially disposed within said envelope; wherein said triggered gap is partially disposed within said shield; and wherein one of said plurality of conductors has a shape structured to prevent metal deposition on the ceramic surface within said envelope.

25. The triggered arc flash arrester of claim 2 wherein one of said plurality of conductors carries a fixed contact and another one of said plurality of conductors carries a movable contact movable between a first position separated from said fixed contact and a second position electrically engaging said fixed contact.

26. A triggered arc flash arrester comprising:
an envelope structured to operate at; a pressure less than about 1.33 Pa; or a pressure greater than 0.10857 MPa;
a plurality of conductors partially disposed within said envelope;
a number of gaps disposed between said plurality of conductors within said envelope; and
a shorting structure comprising a triggered gap,
wherein said shorting structure is operatively associated with said number of gaps, and
wherein said shorting structure is structured to electrically short said plurality of conductors either together or to ground, in order to create an arc within said envelope which is electrically in parallel to an arc fault causing the arc fault internal to switchgear to be extinguished, wherein said envelope comprises a shield and a trigger rod electrode having a first end extending through said shield and electrically isolated from said shield and an opposite second end, said trigger rod electrode extending inwardly within said shield and away from an interior wall of said shield; and wherein said triggered gap is formed by a gap between the opposite second end of said trigger rod electrode and a portion of one of said plurality of conductors.

27. The triggered arc flash arrester of claim 26 wherein said shield has an opening; and wherein said trigger rod electrode is electrically isolated from said shield by an insulator within the opening of said shield.

28. A triggered arc flash arrester comprising:
an envelope structured to operate at; a pressure less than about 1.33 Pa; or a pressure greater than 0.10857 MPa;
a plurality of conductors partially disposed within said envelope;
a number of gaps disposed between said plurality of conductors within said envelope; and
a shorting structure comprising a triggered fuse,
wherein said shorting structure is operatively associated with said number of gaps, and
wherein said shorting structure is structured to electrically short said plurality of conductors either together or to ground, in order to create an arc within said envelope which is electrically in parallel to an arc fault causing the arc fault internal to switchgear to be extinguished, wherein said envelope comprises a shield and a ring electrode encircling said plurality of conductors and having a first portion disposed external to said envelope and a second portion disposed internal to said envelope, wherein said fuse is electrically connected between said ring electrode and one of said plurality of conductors, and wherein said fuse and said ring electrode are electrically isolated from said shield.

* * * * *